US010069988B2

(12) United States Patent  
Saito

(10) Patent No.: US 10,069,988 B2  
(45) Date of Patent: Sep. 4, 2018

(54) IMAGE FORMING APPARATUS, COMPUTER READABLE RECORDING MEDIUM STORED WITH COMPUTER PROGRAM FOR CONTROLLING IMAGE FORMING APPARATUS, AND METHOD FOR CONTROLLING IMAGE FORMING APPARATUS

(71) Applicant: KONICA MINOLTA, INC., Chiyoda-ku, Tokyo (JP)

(72) Inventor: Shuta Saito, Tachikawa (JP)

(73) Assignee: KONICA MINOLTA, INC., Chiyoda-ku, Tokyo (JP)

( * ) Notice: Subject to any disclaimer, the term of this patent is extended or adjusted under 35 U.S.C. 154(b) by 0 days.

(21) Appl. No.: 15/292,413

(22) Filed: Oct. 13, 2016

(65) Prior Publication Data

US 2017/0149990 A1     May 25, 2017

(30) Foreign Application Priority Data

Nov. 25, 2015 (JP) ................................. 2015-230047

(51) Int. Cl.
*H04N 1/00* (2006.01)
*H04N 1/44* (2006.01)

(52) U.S. Cl.
CPC ..... *H04N 1/00832* (2013.01); *H04N 1/00384* (2013.01); *H04N 1/00411* (2013.01);
(Continued)

(58) Field of Classification Search
USPC ........................................................ 358/1.14
See application file for complete search history.

(56) References Cited

U.S. PATENT DOCUMENTS

| 2007/0033530 | A1* | 2/2007 | Motoyama | G06F 9/547 715/736 |
| 2011/0289449 | A1* | 11/2011 | Kakie | G06F 3/04883 715/784 |
| 2015/0185847 | A1* | 7/2015 | Shirai | G06F 3/016 345/174 |

FOREIGN PATENT DOCUMENTS

| JP | 2002-207399 A | 7/2002 |
| JP | 2006-309511 A | 11/2006 |

(Continued)

OTHER PUBLICATIONS

Mitsunobu, Program Information Storage Medium Game Device and Game Device Management Mechanism, Oct. 18, 2007, Machnine Translated Japanese Partent Application Publication, JP2007-26786, All Pages.*

(Continued)

*Primary Examiner* — Ngon Nguyen
(74) *Attorney, Agent, or Firm* — Buchanan Ingersoll & Rooney PC

(57) ABSTRACT

An image forming apparatus capable of ensuring a log when a malfunction has occurred in an operation panel, without affecting working performance of the image forming apparatus is provided. The image forming apparatus includes a volatile memory, an operation device, and a processor. The volatile memory accumulates a log of actions of each function and has a volatile property. The operation device receives user operations performed by a user. The processor is configured to determine whether a user operation pattern based on a series of the user operations within a certain period of time received by the operation device satisfies a predetermined condition or not. Then, when the user operation pattern satisfies the predetermined condition, the processor is configured to store the log accumulated in the (Continued)

volatile memory into a nonvolatile memory having a nonvolatile property.

32 Claims, 10 Drawing Sheets

(52) U.S. Cl.
CPC ....... *H04N 1/00514* (2013.01); *H04N 1/4433* (2013.01); *H04N 2201/0094* (2013.01)

(56) References Cited

FOREIGN PATENT DOCUMENTS

| | | |
|---|---|---|
| JP | 2007-267876 A | 10/2007 |
| JP | 2008-009854 A | 1/2008 |

OTHER PUBLICATIONS

Japanese Official Notice of Reason for Refusal Nov. 14, 2017 in corresponding Japanese Patent Application 2015-230047 (Machine Translation).

\* cited by examiner

IMAGE FORMING APPARATUS, COMPUTER READABLE RECORDING MEDIUM STORED WITH COMPUTER PROGRAM FOR CONTROLLING IMAGE FORMING APPARATUS, AND METHOD FOR CONTROLLING IMAGE FORMING APPARATUS

CROSS-REFERENCE TO RELATED APPLICATION

This application is based on Japanese Patent Application No. 2015-230047 filed on Nov. 25, 2015, the contents of which are incorporated herein by reference.

BACKGROUND

1. Field of the Invention

The present invention relates to an image forming apparatus, a computer readable recording medium stored with computer program for controlling an image forming apparatus, and a method for controlling an image forming apparatus.

2. Description of Related Art

In the past, various techniques have been suggested to store history data (log) of actions of an apparatus, so that, at a later point in time, a user finds a content of a malfunction which has occurred when the user uses a certain type of apparatuse. See Japanese Patent Publication No. 2007-267876. This technique discloses a game apparatus for storing history data about operation inputs performed with operation input means in order to find a malfunction in the operation input means such as button switches. The game apparatus detects a loss of operation input signals on the basis of the history data of the operation inputs, and determines abnormality of the operation input means. The history data of the operation inputs is repeatedly obtained in order to determine abnormality, and is accumulated in an IC memory and the like in chronological order. The IC memory and the like need to be a nonvolatile memory so that a malfunction can be found at a later point in time even when an electric power supply of the apparatus is turned off.

However, processing for accumulating data in a nonvolatile memory as necessary requires a high level of processing load, and therefore, this processing may adversely affect the working performance of the apparatus. On the other hand, a method for storing data without affecting the working performance includes a method for accumulating data in a volatile memory such as a RAM. However, the volatile memory has a problem in that it cannot maintain the accumulated data when the electric power supply of the apparatus is turned off.

Under the circumstances involving the above problem, an image forming apparatus and the like often put importance on storing a log of actions based on operations performed by a user without adversely affecting the working performance of the image forming apparatus, and therefore, use a volatile memory. The log is accumulated so that, at a later point in time, a developer and the like finds a content of a malfunction occurring while the image forming apparatus is used.

In this case, while the image forming apparatus is used, a malfunction such as a freeze (a state in which actions are stopped due to some reason, and operations cannot be received) is assumed to have occurred on an operation panel of the image forming apparatus. When a user of the image forming apparatus contacts a customer service to inquire about the malfunction, a service personnel may visit the user to directly cope with the malfunction. When the service personnel is unable to identify the cause of the malfunction, the service personnel obtains a log accumulated in a volatile memory of the image forming apparatus and provides the log to the developer and the like of the image forming apparatus. Then, the developer and the like can analyze the malfunction at a later point in time on the basis of the log. However, if the user turns off the image forming apparatus from when a malfunction of a freeze occurs to when the service personnel visits the user, the log accumulated in the volatile memory is lost. Therefore, when the user turns off the image forming apparatus, there is a problem in that the developer and the like cannot analyze the malfunction on the basis of the log, and cannot identify the cause of the malfunction.

SUMMARY

The present invention is made in view of the above circumstances. Therefore, an object of the present invention is to provide an image forming apparatus, a computer readable recording medium stored with computer program for controlling an image forming apparatus, and a method for controlling an image forming apparatus, capable of ensuring a log when a malfunction has occurred in an operation panel, without affecting working performance of the image forming apparatus.

To achieve at least one of the abovementioned objects, an image forming apparatus reflecting one aspect of the present invention comprises a volatile memory accumulating a log of actions of each function and having a volatile property; an operation device receiving user operations performed by a user; and a processor configured to determine whether a user operation pattern based on a series of the user operations within a certain period of time received by the operation device satisfies a predetermined condition or not, and to store the log accumulated in the volatile memory into a nonvolatile memory having a nonvolatile property when the user operation pattern satisfies the predetermined condition.

The image forming apparatus preferably further comprises a display capable of displaying a user interface; and a display processing unit controlling the display. In the image forming apparatus, when the user operation pattern satisfies the predetermined condition, the processor preferably performs availability confirmation on the display processing unit to determine whether the processor receives an availability signal indicating availability from the display processing unit or not, and stores the log in the nonvolatile memory when the processor does not receive the availability signal.

In the image forming apparatus, the display processing unit preferably includes a panel processor configured to control each function of an operation panel including the display, and a UI processing unit for controlling the user interface displayed on the display. When the user operation pattern satisfies the predetermined condition, the processor preferably performs the availability confirmation on the panel processor and the UI processing unit, and stores the log in the nonvolatile memory when the processor does not receive the availability signal from at least one of the panel processor and the UI processing unit.

In the image forming apparatus, when the processor receives the availability signal from both of the panel processor and the UI processing unit, the processor preferably further determines whether there is a malfunction in the display or not via the panel processor, and stores the log in the nonvolatile memory when there is the malfunction in the display.

In the image forming apparatus, the predetermined condition preferably includes a case where the number of times of the series of the user operations in the user operation pattern is equal to or more than a reference number of times.

The image forming apparatus preferably further comprises a sensor capable of detecting vibrations generated by the user operations. In the image forming apparatus, the processor preferably deems that the number of times of vibrations detected by the sensor is the number of times of the series of the user operations, and determines whether the number of times of vibrations is equal to or more than the reference number of times or not.

In the image forming apparatus, when the number of times of the series of the user operations is equal to or more than the reference number of times, and the processor does not receive the availability signal, the processor preferably corrects the reference number of times on the basis of the number of times of the series of the user operations.

In the image forming apparatus, when the number of times of the series of the user operations is equal to or more than the reference number of times, and the processor receives the availability signal, the processor preferably temporarily stores the user operation pattern as an incorrect pattern in the volatile memory, and when a storing of the incorrect pattern still remains in the volatile memory in a case that an electric power supply to the volatile memory is stopped, the processor preferably corrects the reference number of times on the basis of the number of times of the series of the user operations in the incorrect pattern.

In the image forming apparatus, the predetermined condition preferably includes a case where the user operation pattern matches a reference pattern, which is an operation pattern serving as a reference, with a matching rate equal to or more than a reference value.

In the image forming apparatus, when the user operation pattern matches the reference pattern with the matching rate equal to or more than the reference value, and the processor does not receive the availability signal, the processor preferably corrects at least one of the reference value and the reference pattern on the basis of the matching rate of the user operation pattern with respect to the reference pattern.

In the image forming apparatus, when the user operation pattern matches the reference pattern with the matching rate equal to or more than the reference value, and the processor receives the availability signal, the processor preferably temporarily stores the user operation pattern as an incorrect pattern in the volatile memory, and when a storing of the incorrect pattern still remains in the volatile memory in a case that an electric power supply to the volatile memory is stopped, the processor preferably corrects at least one of the reference value and the reference pattern on the basis of the matching rate of the incorrect pattern with respect to the reference pattern.

In the image forming apparatus, the processor preferably executes reboot processing in order to solve the malfunction in the display processing unit after the processor stores the log in the nonvolatile memory.

In the image forming apparatus, the processor preferably comprises a main processor configured to control each function; and a sub processor configured to be capable of receiving the user operations via hard keys which are physical keys provided in the operation device, even when the main processor is in a suspended state. The sub processor preferably determines whether the user operation pattern based on the series of the user operations within a certain period of time received via the hard key satisfies the predetermined condition or not, and transmits a notification indicating that the predetermined condition is satisfied to the main processor when the user operation pattern satisfies the predetermined condition. When the main processor receives the notification from the sub processor, the main processor preferably stores the log in the nonvolatile memory.

The image forming apparatus is preferably further comprises a user authentication unit capable of authenticating the user. In the image forming apparatus, the predetermined condition is preferably set individually for each of the users authenticated.

In the image forming apparatus, when the processor receives a notification indicating that the predetermined condition is satisfied from an external portable terminal for receiving user operations and determining whether a user operation pattern based on the series of the user operations within a certain period of time satisfies the predetermined condition or not, the processor preferably stores the log in the nonvolatile memory.

In the image forming apparatus, when the processor receives the notification, the processor preferably performs availability confirmation on a terminal processor for controlling a terminal display, which is a display provided on the portable terminal, and a UI processing unit for controlling a user interface displayed on the terminal display, and stores the log in the nonvolatile memory when the processor does not receive an availability signal from at least one of the terminal processor and the UI processing unit.

The objects, features, and characteristics of this invention other than those set forth above will become apparent from the description given herein below with reference to preferred embodiments illustrated in the accompanying drawings.

DETAILED DESCRIPTION

Figure 1:
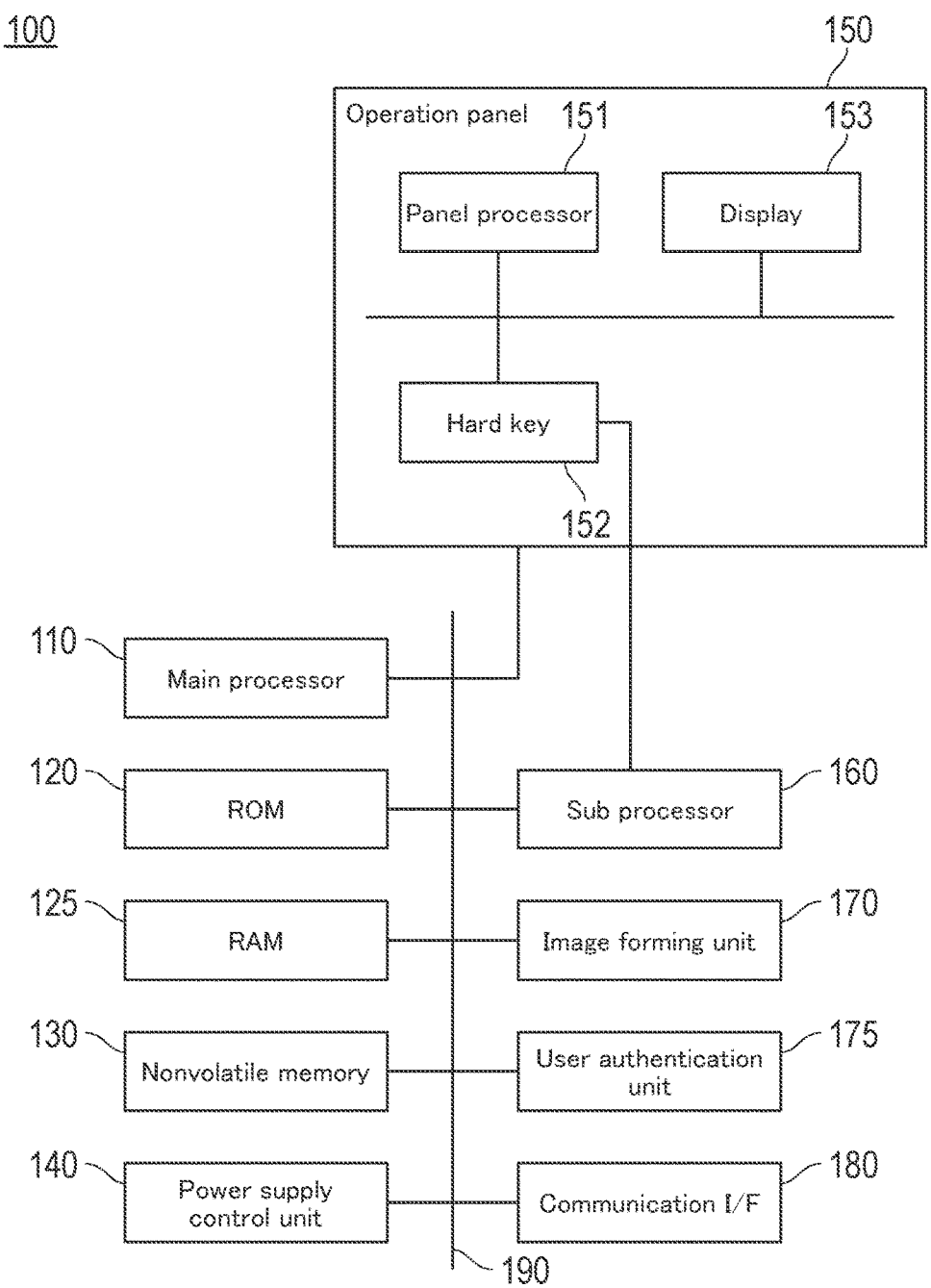
FIG. 1 is a block diagram illustrating a schematic configuration of an image forming apparatus according to an embodiment of the present invention.

Hereinafter, an embodiment of the present invention will be explained with reference to appended drawings. In the explanation about the drawings, the same elements are denoted with the same reference numerals, and repeated explanation thereabout is omitted. The dimensions and the ratios in the drawings are exaggerated for the sake of explanation, and may be different from actual ratios.

Figure 2:
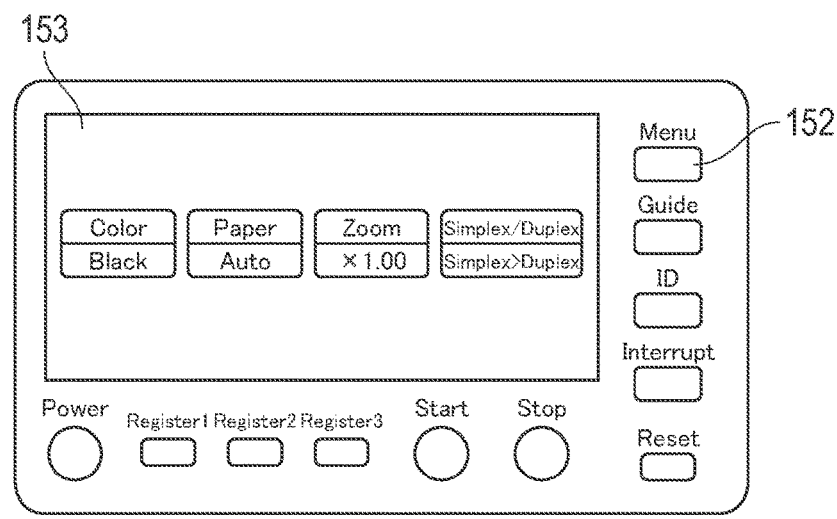
FIG. 2 is a figure illustrating an example of an external view of an operation panel.

FIG. 1 is a block diagram illustrating a schematic configuration of an image forming apparatus according to an embodiment of the present invention. FIG. 2 is a figure illustrating an example of an external view of an operation panel 150.

An image forming apparatus 100 is a printer, a Multi-Function Peripheral (MFP), and the like. Hereinafter, the configuration of the image forming apparatus 100 will be explained.

The image forming apparatus 100 comprises a main processor (processor) 110, a ROM (Read Only Memory) 120, a RAM (Random Access Memory, a volatile memory) 125, a nonvolatile memory 130, a power supply control unit 140, an operation panel 150, a sub processor (processor) 160, an image forming unit 170, a user authentication unit 175, and a communication I/F (Interface) 180. Each configuration is connected to communicate with each other via a bus 190.

The main processor 110 is a CPU (Central Processing Unit), a GPU (Graphics Processing Unit) or any other hardware component which can achieve implementation of any functions. The main processor 110 controls each of the above configurations in accordance with a program and executes various kinds of computation processing. The main processor 110 executes main controls of the image forming apparatus such as printing and copying.

The ROM 120 is a memory storing various kinds of programs and various kinds of data, and used by the main processor 110. The ROM 120 is a memory having a nonvolatile property and is capable of maintaining storing of programs and data even when the electric power is not supplied.

The RAM 125 is a memory temporarily storing programs and data as a work area and used by the main processor 110. The RAM 125 is a memory having a volatile property and is not capable of maintaining storing of programs and data unless the electric power is supplied. More specifically, when the electric power supply of the image forming apparatus 100 is turned off, the RAM 125 loses storing of programs and data. On the other hand, in many cases, the processing of reading and writing of data from and to the RAM 125 can be performed with a lighter processing load and shorter processing time than the processing of reading and writing of data from and to the ROM 120 and the nonvolatile memory 130. Therefore, the RAM 125 is used to temporarily store large-size data and the like. In this embodiment, the RAM 125 accumulates a log of actions of each configuration of the image forming apparatus 100 (hereinafter simply referred to as "log"). The details of the log will be explained later.

The nonvolatile memory 130 is a memory including a flash memory, a hard disk, a USB memory, and the like, and used by the main processor 110. The nonvolatile memory 130 is a memory having a nonvolatile property and is capable of maintaining storing of data even when the electric power is not supplied, as well as the ROM 120. In this embodiment, the ROM 120 and the nonvolatile memory 130 are distinguished from each other in that the ROM 120 is basically a non-rewritable memory, whereas the nonvolatile memory 130 can store data in a rewritable manner. The nonvolatile memory 130 may be provided outside of the image forming apparatus 100.

The power supply control unit 140 controls electric power supply to each configuration. The power supply control unit 140 can control whether electric power is to be supplied to each configuration or not, and for example, the power supply control unit 140 can control so that electric power is supplied to only the sub processor 160.

The operation panel 150 comprises a panel processor (display processing unit) 151, a hard key (operation device) 152, and a display 153, and is configured to receive operations performed by a user (hereinafter referred to as a "user operations") and display various kinds of information.

The panel processor 151 controls each configuration (each function) of the operation panel 150 in accordance with a program stored in a storage area provided therein and the like, a command given by the main processor 110, and the like. For example, the panel processor 151 receives a signal indicating user operations from the hard key 152, and displays a user interface (UI) on the display 153.

The hard key 152 is physical keys provided in the operation panel 150, and receives user operations. In the example of FIG. 2, the hard key 152 is a key such as, e.g., a start key, a stop key, a menu key, and the like. The user operates the image forming apparatus 100 by pressing down the hard key 152. It should be noted that the hard key 152 is directly connected to not only the panel processor 151 but also the sub processor 160 explained later. Then, when the hard key 152 receives user operations, the hard key 152 can transmit a signal indicating the received user operations to both of the panel processor 151 and the sub processor 160.

The display 153 is, for example, a touch panel, a liquid crystal screen, and the like. The display 153 can be controlled by the panel processor 151 to display a user interface. In the example of FIG. 2, the display 153 displays a user interface including a key for selecting a color, a key for selecting a sheet used in copying, and the like. When the display 153 is a touch panel, the user can operate the image forming apparatus 100 by directly touching these keys. Input means (keys) displayed on the display 153 by being controlled by the panel processor 151 as described above will be referred to as "software keys". More specifically, the software key as well as the hard key 152 constitutes the operation device.

In this embodiment, the hard key 152 is included in the operation panel 150, and is integrally formed with the display 153, but the present invention is not limited thereto. Alternatively, the hard key 152 may not be included in the operation panel 150, and may be formed separately from the display 153.

The sub processor 160 is a processor such as a CPU (Central Processing Unit), a GPU (Graphics Processing Unit) or any other hardware component which can achieve implementation of any functions. The sub processor 160 is used to achieve power-saving mode in the image forming apparatus 100, and can receive a signal indicating user operations received by the hard key 152.

The power-saving mode is a function for suppressing the standby power requirement of the image forming apparatus 100 by stopping electric power supply to the main processor 110, the RAM 125, the operation panel 150, and the like while the user is not using the image forming apparatus 100. The image forming apparatus 100 enters into a power-saving mode from normal working state when a certain period of time or more passes while the image forming apparatus 100 is not working, or when a user operation is performed for setting the power-saving mode with the operation panel 150 and the like.

When the image forming apparatus 100 enters into the power-saving mode, the power supply control unit 140 makes the main processor 110 and the like into a suspended state as the power supply control unit 140 stops the electric power supply to the main processor 110, the operation panel 150, and the like. Then, the main processor 110 cannot receive user operations via the panel processor 151. On the other hand, the power supply control unit 140 continues the electric power supply to the sub processor 160. As described above, the hard key 152 can directly transmit a signal indicating user operations to the sub processor 160, and therefore, the sub processor 160 can receive the signal even when the main processor 110 is in a suspended state. Then, when the sub processor 160 receives the signal in the power-saving mode, the sub processor 160 starts processing for restoring the image forming apparatus 100 from the power-saving mode. Then, the power supply control unit 140 resumes the electric power supply to the main processor 110 and the like, thereby the image forming apparatus 100 can resume normal working.

The image forming unit 170 uses well-known image forming process such as electrophotographic process including the steps of charging, exposure, development, transfer, fixing, and the like to form an image based on various kinds of data to a sheet as a recording medium.

The user authentication unit 175 includes, for example, an IC card reader and the like, and can authenticate the user who uses the image forming apparatus 100. The user authentication unit 175 performs wireless communication with an IC card of the user to authenticate the user by reading user information stored in the IC card. The user authentication unit 175 may authenticate the user through a user operation such as a password input and the like with the operation panel 150.

The communication I/F 180 is an interface for communicating with another device, and uses specification such as Ethernet (registered trademark), FDDI, Wi-Fi, and the like.

Subsequently, a functional configuration of the image forming apparatus 100 will be explained.

Figure 3:
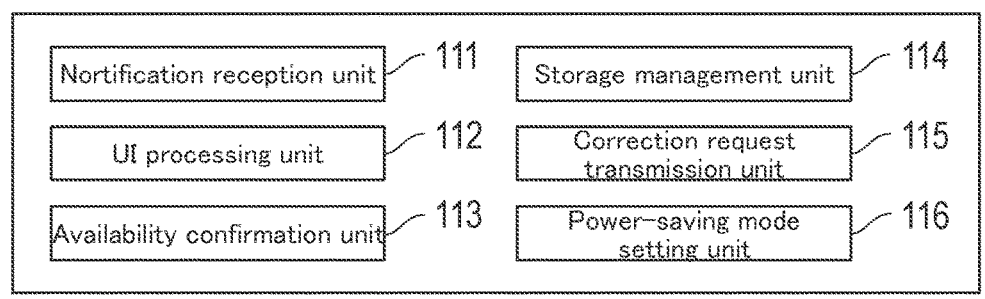
FIG. 3 is a block diagram illustrating a functional configuration of a main processor of the image forming apparatus.

FIG. 3 is a block diagram illustrating a functional configuration of the main processor 110 of the image forming apparatus 100. The main processor 110 reads a program and executes processing to function as a notification reception unit 111, a UI processing unit (display processing unit) 112, an availability confirmation unit 113, a storage management unit 114, a correction request transmission unit 115, and a power-saving mode setting unit 116.

The notification reception unit 111 has a function to receive a notification indicating that a predetermined condition is satisfied, and the like, from the sub processor 160. The predetermined condition will be explained in the explanation about the functional configuration of the sub processor 160.

The UI processing unit 112 has a function to control drawing, screen transition, and the like of a user interface displayed on the display 153 of the operation panel 150. The user interface controlled by the UI processing unit 112 is displayed on the display 153 controlled by the panel processor 151, via the panel processor 151. More specifically, the UI processing unit 112 as well as the panel processor 151 controls display on the display 153 of the operation panel 150.

The availability confirmation unit 113 has a function to perform availability confirmation on the panel processor 151 and the UI processing unit 112, and to determine whether the availability confirmation unit 113 receives a signal indicating availability (hereinafter referred to as an "availability signal") from the panel processor 151 and the UI processing unit 112 or not, in response to the availability confirmation. The "availability" means that each configuration of the image forming apparatus 100 is working normally. In this embodiment, the availability confirmation is performed in order to confirm that the panel processor 151 and the UI processing unit 112 are working normally (a malfunction such as a freeze does not occur). The availability signal is a signal generated by the panel processor 151 and the UI processing unit 112 when the panel processor 151 and the UI processing unit 112 are available. A result of the availability confirmation is one of the following: the availability confirmation unit 113 receives an availability signal; the availability confirmation unit 113 receives a signal other than the availability signal such as a signal indicating that a malfunction has occurred in the panel processor 151 and/or the UI processing unit 112; or the availability confirmation unit 113 does not receive any signal. The availability confirmation unit 113 determines that an availability signal is not received when a signal other than the availability signal is received, or no signal is received for a certain period or more. The availability confirmation unit 113 can also determine, via the panel processor 151, whether a malfunction has occurred in the display 153 or not.

The storage management unit 114 has a function to store a log in the nonvolatile memory 130, as necessary, wherein the log is concerning actions of each configuration of the image forming apparatus 100 accumulated in the RAM 125. The storage management unit 114 also temporarily stores various kinds of data and the like in the RAM 125, as necessary.

In this case, the "log" in this embodiment means a log that can be obtained by a service personnel who visits the user of the image forming apparatus 100 when a malfunction has occurred in the image forming apparatus 100. The log is obtained in order to allow a developer and the like to analyze the malfunction at a later point in time. The log is obtained by using a PC and the like connected to the image forming apparatus 100. The log is not a log stored when a malfunction has occurred, but is a log accumulated for a certain period of time, including information about actions, states, and the like of each configuration (each function). More specifically, the log includes detailed information about actions of each configuration such as information about a screen transition on the display 153, information about user operations with the hard key 152, and a communication log between the main processor 110, the panel processor 151, and the sub processor 160. The developer and the like can analyze the log to find user operations, internal processing, and the like that have been performed before the malfunction occurs, so that the developer and the like can identify the cause of the malfunction.

The correction request transmission unit 115 has a function to transmit, to the sub processor 160, a request for correcting a predetermined condition stored in the sub processor 160, as necessary. The predetermined condition will be explained in the explanation about the functional configuration of the sub processor 160.

The power-saving mode setting unit 116 has a function to set the power-saving mode when a certain period of time or more passes while the image forming apparatus 100 is not working, or when a user operation is performed to set the power-saving mode with the operation panel 150, and the like. The power-saving mode setting unit 116 causes the power supply control unit 140 to stop electric power supply to the main processor 110, the RAM 125, the operation panel 150, and the like.

Figure 4:
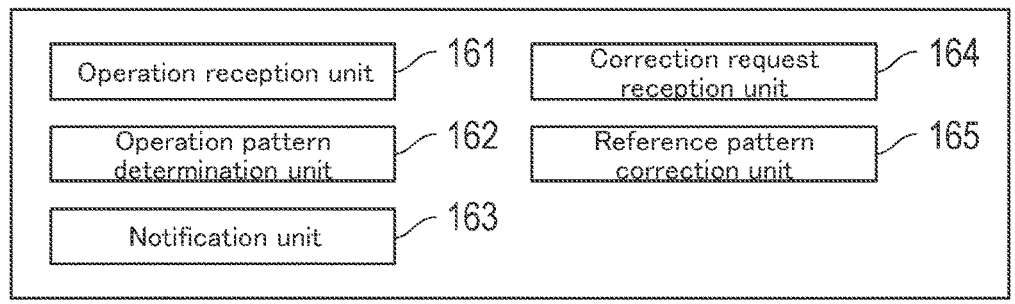
FIG. 4 is a block diagram illustrating a functional configuration of a sub processor of the image forming apparatus.

Subsequently, FIG. 4 is a block diagram illustrating a functional configuration of the sub processor 160 of the image forming apparatus 100. The sub processor 160 reads a program and executes processing to function as an operation reception unit 161, an operation pattern determination unit 162, a notification unit 163, a correction request reception unit 164, and a reference pattern correction unit 165.

The operation reception unit 161 has a function to receive a signal indicating user operations to receive user operations on the basis of the signal. The operation reception unit 161 receives, for example, a signal indicating that the start key included in the hard key 152 is pressed down from the hard key 152 to receive the press-down of the start key as a user operation.

The operation pattern determination unit 162 has a function to identify an operation pattern based on a series of user operations (hereinafter referred to as "user operation pattern") to determine whether the user operation pattern satisfies the predetermined condition or not. The series of the user operations is continuous user operations received by the hard key 152 and the like. The user operation pattern includes the number of times of the series of the user operations (hereinafter referred to as "the number of user operations"), for example, the number of times the user operates (presses down) the hard key 152 and the like. The user operation pattern may be identified by what type of hard key of the hard key 152 the user operates in what kind of order.

The predetermined condition is a condition which is applied to a user operation pattern to detect a possibility that a malfunction has occurred in the operation panel 150. The predetermined condition is stored in a nonvolatile storage area (not illustrated) and the like in the inside of the sub processor 160. The predetermined condition may be set by the user in advance, and may be changed as necessary.

The notification unit 163 has a function to transmit a notification indicating that the predetermined condition is satisfied to the main processor 110, and the like, when the user operation pattern satisfies the predetermined condition.

The correction request reception unit 164 has a function to receive a request for correcting a predetermined condition from the main processor 110.

The reference pattern correction unit 165 has a function to correct the predetermined condition on the basis of the request for correcting the predetermined condition.

Figure 5:
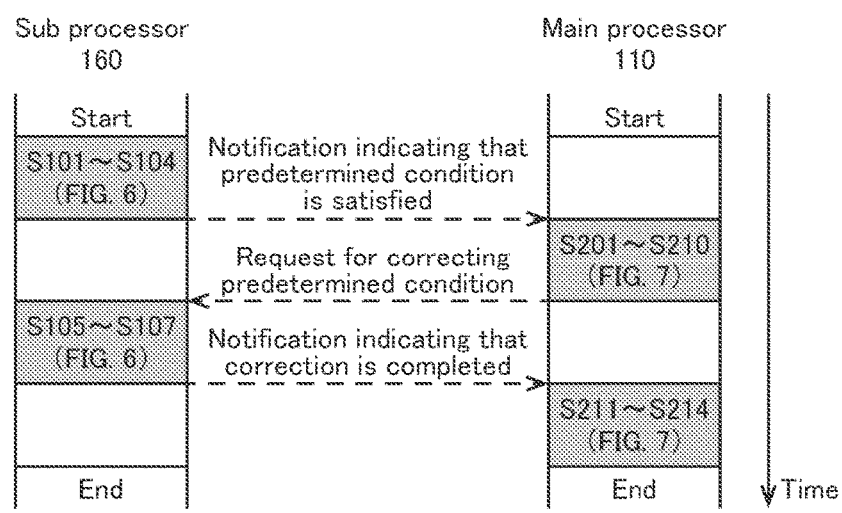
FIG. 5 is a figure illustrating a relationship of processing of a main processor and a sub processor.
Figure 6:
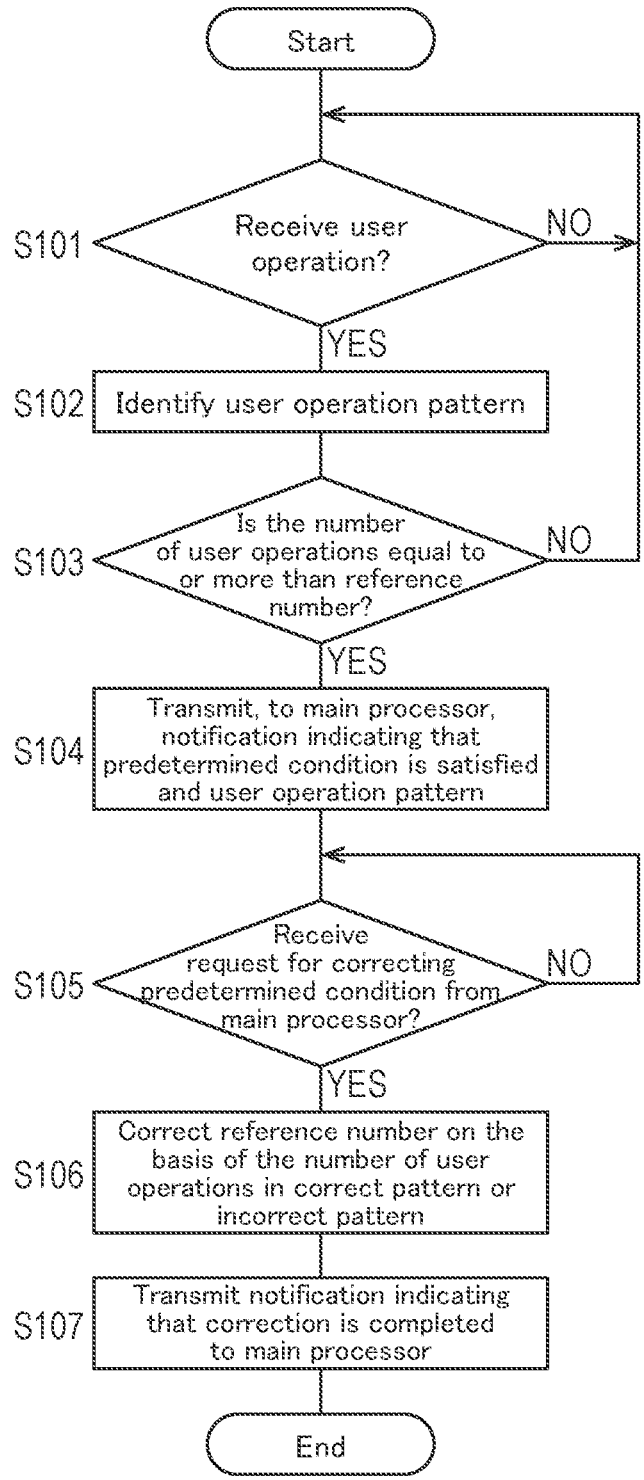
FIG. 6 is a flowchart illustrating an example of a procedure of processing of a sub processor.
Figure 7:
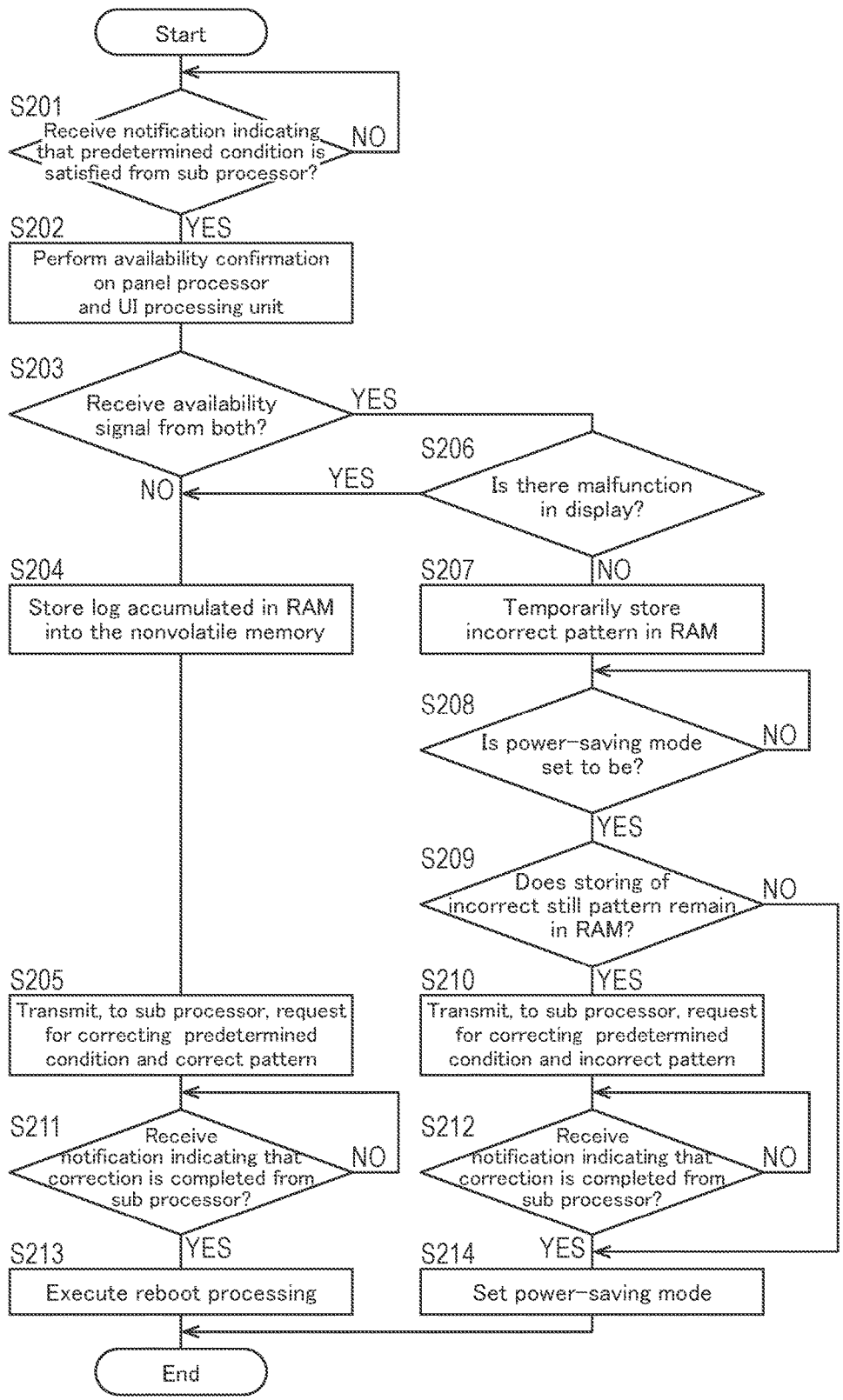
FIG. 7 is a flowchart illustrating a procedure of processing of a main processor.

Subsequently, a procedure of processing of the image forming apparatus 100 according to this embodiment will be explained. FIG. 5 is a figure illustrating a relationship of processing of the main processor 110 and the sub processor 160. FIG. 6 to FIG. 7 are flowcharts illustrating a procedure of processing of the image forming apparatus 100. The program of the image forming apparatus 100 is to control so as to ensure a log when a malfunction has occurred in the operation panel 150, without affecting the working performance of the image forming apparatus 100.

As illustrated in FIG. 5, the main processor 110 and the sub processor 160 proceeds processing by communicating with each other as the time passes. In short, first, the sub processor 160 determines whether the user operation pattern satisfies the predetermined condition or not, and when the predetermined condition is satisfied, the sub processor 160 notifies the main processor 110. When the main processor 110 receives a notification indicating that the predetermined condition is satisfied, the main processor 110 determines whether a log is to be stored in the nonvolatile memory 130 or not. Further, as necessary, the main processor 110 requests the sub processor 160 to correct the predetermined condition. When the sub processor 160 completes the correction of the predetermined condition, the sub processor 160 transmits a notification indicating that the correction is completed to the main processor 110. First, the processing of the sub processor 160 will be explained in order to explain the procedure of processing in the sequence of time in FIG. 5.

FIG. 6 is a flowchart illustrating an example of a procedure of processing of the sub processor 160. The processing illustrated in the flowchart of FIG. 6 is stored as a program in the nonvolatile storage area inside of the sub processor 160.

First, while a user operation is ready to be input, the sub processor 160 serves as the operation reception unit 161 to determine whether a user operation is received or not, via the hard key 152 (step S101).

When a user operation is not received (step S101: NO), the sub processor 160 waits until a user operation is received.

When a user operation is received (step S101: YES), the sub processor 160 serves as the operation pattern determination unit 162 to identify user operation pattern on the basis of a series of the user operations within a certain period of time (step S102).

Subsequently, the sub processor 160 determines whether the identified user operation pattern satisfies a predetermined condition or not. In this embodiment, the predetermined condition means that the number of user operations in the user operation pattern is equal to or more than a predetermined number of times serving as a reference (hereinafter referred to as "reference number"). More specifically, the sub processor 160 serves as the operation pattern determination unit 162 to determine whether the number of user operations in the user operation pattern is equal to or more than the reference number or not (step S103).

In step S103, the reason why a determination is made as to whether the number of user operations is equal to or more than the reference number or not is as follows. The processing in step S103 is processing for detecting a possibility that a malfunction has occurred in the operation panel 150. When a malfunction such as a freeze has occurred in the operation panel 150, the user may repeatedly hit the hard key 152 of the operation panel 150 in order to determine whether a malfunction has occurred or not. On the other hand, it is unlikely that the user repeatedly hits the hard key 152 during normal working of the image forming apparatus 100. As described above, there is a difference in the situation between a case where a malfunction has occurred and normal working, and therefore, the sub processor 160 can determine that there is a possibility that a malfunction has occurred when the user repeatedly hits the hard key 152. Therefore, in step S103, the above determination is made.

When the number of user operations is not equal to or more than the reference number (step S103: NO), the sub processor 160 determines that a malfunction does not occur in the operation panel 150, and returns back to the processing in step S101. Then, the sub processor 160 waits until a new user operation is received.

When the number of user operations is equal to or more than the reference number (step S103: YES), the sub processor 160 proceeds to the processing in step S104. Then, the sub processor 160 serves as the notification unit 163 to transmit, to the main processor 110, a notification indicating that the predetermined condition is satisfied and the user operation pattern identified in step S102 (step S104). This means that the sub processor 160 detects a possibility that a malfunction has occurred in the operation panel 150 on the basis of the number of user operations.

Subsequently, the processing of the main processor 110 for receiving the notification transmitted in step S104 will be explained in order to explain the procedure of processing in the sequence of time in FIG. 5. The processing of the main processor 110 is processing for determining whether a malfunction has occurred or not on the basis of a possibility that a malfunction has occurred in the operation panel 150, and ensuring a log when the malfunction has actually occurred.

FIG. 7 is a flowchart illustrating a procedure of processing of the main processor 110. The processing illustrated in the flowchart of FIG. 7 is stored as a program in the ROM 120 or the nonvolatile memory 130.

The main processor 110 serves as the notification reception unit 111 to determine whether the notification indicating that the predetermined condition is satisfied is received from the sub processor 160 or not (step S201).

When the notification indicating that the predetermined condition is satisfied is not received (step S201: NO), the main processor 110 waits until the notification is received.

When the notification indicating that the predetermined condition is satisfied is received (step S201: YES), the main processor 110 serves as the availability confirmation unit 113 to perform availability confirmation on the panel processor 151 and the UI processing unit 112 (step S202). Then, the main processor 110 determine whether availability signals are received from both of the panel processor 151 and the UI processing unit 112 or not (step S203).

The availability confirmation in step S202 is performed in order to confirm whether a malfunction has occurred in the operation panel 150 or not. A malfunction such as a freeze in the operation panel 150 may be caused by the panel processor 151 for controlling each configuration of the operation panel 150. A case where a malfunction is caused by the panel processor 151 includes, for example, a case where the panel processor 151 transmits a signal for controlling drawing and the like to the display 153 and then the processing of the panel processor 151 is frozen by occurring a communication error. A malfunction in the operation panel 150 may also be caused by the UI processing unit 112 of the main processor 110 for controlling the user interface displayed on the display 153 of the operation panel 150. Therefore, in step S202, the main processor 110 performs availability confirmation on both of the panel processor 151 and the UI processing unit 112.

When an availability signal is not received from at least one of the panel processor 151 and the UI processing unit 112 (step S203: NO), the main processor 110 proceeds to the processing in step S204. In this case, a malfunction has actually occurred in the operation panel 150. In the following explanation, when step S203 is NO, the user operation pattern transmitted from the sub processor 160 in step S104 will be referred to as "correct pattern". In other words, the correct pattern is a user operation pattern operated when a malfunction has actually occurred.

Subsequently, the main processor 110 serves as the storage management unit 114 to store the log accumulated in the RAM 125 into the nonvolatile memory 130 (step S204).

In step S204, the reason why the main processor 110 stores the log accumulated in the RAM 125 into the nonvolatile memory 130 is that the log is to be ensured before the electric power supply of the image forming apparatus 100 is turned off. As described above, the log accumulated in the RAM 125 is lost when the electric power supply is turned off. Therefore, the main processor 110 stores the log in the nonvolatile memory 130 capable of maintaining storing even when the electric power supply is turned off.

Subsequently, the main processor 110 serves as the correction request transmission unit 115 to transmit the correct pattern and a request for correcting the predetermined condition on the basis of the correct pattern to the sub processor 160 (step S205). Transmission of the request is a so-called feedback for improving the accuracy of the predetermined condition.

On the other hand, when availability signals are received from both of the panel processor 151 and the UI processing unit 112 (step S203: YES), the main processor 110 proceeds to the processing in step S206. In this case, this means that a malfunction does not occur in the operation panel 150. In the following explanation, when step S203 is YES, the user operation pattern transmitted from the sub processor 160 in step S104 will be referred to as an "incorrect pattern". In other words, the incorrect pattern is a user operation pattern operated when a malfunction does not occur.

Subsequently, the main processor 110 serves as the availability confirmation unit 113 to determine whether there is a malfunction in the display 153 or not, via the panel processor 151 (step S206). More specifically, when the availability signal is received from the panel processor 151, the main processor 110 determines whether information indicating a malfunction in the display 153 as well as the availability signal is received or not.

In this embodiment, a case where a malfunction has not occurred in the panel processor 151, but a malfunction has occurred in the display 153 controlled by the panel processor 151 will also be considered. A malfunction in the display 153 is caused by, for example, corrosion of a part of the display 153. When the display 153 is a touch panel and a part of the touch panel is corroded, the display 153 may be continuously touched at all times. The panel processor 151 can detect the state in which the display 153 is continuously touched, and therefore, can detect a malfunction in the display 153. When the panel processor 151 detects a malfunction in the display 153, the panel processor 151 transmits information indicating a malfunction in the display 153 to the main processor 110.

When there is a malfunction in the display 153 (step S206: YES), the main processor 110 proceeds to the processing in step S204. Then, the main processor 110 performs the same processing as when the availability signal is not received from at least one of the panel processor 151 and the UI processing unit 112 (step S203: NO). When step S206 is YES, the user operation pattern transmitted from the sub processor 160 in step S104 is also a correct pattern.

When there is not any malfunction in the display 153 (step S206: NO), the main processor 110 serves as the storage management unit 114 to temporarily store the incorrect pattern in the RAM 125 (step S207). Then, the main processor 110 serves as the power-saving mode setting unit 116 to determine whether the power-saving mode is to be set or not (step S208).

When the power-saving mode is not to be set (step S208: NO), the main processor 110 waits until the power-saving mode is to be set. More specifically, the main processor 110 waits until a certain period of time or more passes while the image forming apparatus 100 is not working, or until a user operation is performed to set the power-saving mode with the operation panel 150, and the like. It should be noted that, while the main processor 110 is waiting until the power-saving mode is set, the sub processor 160 can receive another series of user operations. In this case, the processing of FIG. 6 is newly started.

When the power-saving mode is to be set (step S208: YES), the main processor 110 performs the processing in steps S209, S210, and S212 before the power-saving mode is set.

The main processor 110 determines whether a storing of the incorrect pattern still remains in the RAM 125 or not (step S209). The RAM 125 loses the storing of the incorrect pattern not only when the electric power supply of the image forming apparatus 100 is turned off but also when new data is accumulated as the time elapses. For this reason, the main processor 110 needs to make a determination in step S209 before entering into the power-saving mode.

When the storing of the incorrect pattern does not remain (step S209: NO), the main processor 110 serves as the power-saving mode setting unit 116 to set the power-saving mode as it is (step S214). Then, the main processor 110 ends the processing.

When the storing of the incorrect pattern still remains (step S209: YES), the main processor 110 serves as the correction request transmission unit 115 to transmit the incorrect pattern and a request for correcting the predetermined condition on the basis of the incorrect pattern to the sub processor 160 (step S210).

Subsequently, explanation will be made upon once returning back to step S105 of FIG. 6 in order to explain a procedure of processing in the sequence of time in FIG. 5. The processing of the sub processor 160 explained below is processing for correcting the predetermined condition on the basis of the correct pattern or the incorrect pattern.

The sub processor 160 serves as the correction request reception unit 164 to determine whether the request for correcting the predetermined condition is received from the main processor 110 or not (step S105).

When the request for correcting the predetermined condition is not received (step S105: NO), the sub processor 160 waits until the request for correcting the predetermined condition is received.

When the request for correcting the predetermined condition is received (step S105: YES), the sub processor 160 serves as the reference pattern correction unit 165 to correct the reference number on the basis of the number of user operations in the correct pattern or the incorrect pattern (step S106). The correct pattern or the incorrect pattern is a pattern transmitted from the main processor 110 in step S205 or S210.

For example, a reference number which is the number of user operations in a predetermined condition within a certain period of time is assumed to be set to five times, and the number of user operations in a correct pattern when a malfunction has occurred is assumed to be six times. In this case, the sub processor 160 serves as the reference pattern correction unit 165, and can correct the reference number from five times to six times in order to set the reference number that is more suitable for practical use. For example, the reference number is assumed to be set to five times, and the number of user operations in a correct pattern is also assumed to be five times. In this case, the sub processor 160 may predict that it could have detected that a possibility that a malfunction has occurred in a shorter period of time by setting the reference number to a lower value, and may correct the reference number from five times to four times and the like. As described above, the sub processor 160 can correct the reference number on the basis of the number of user operations in the correct pattern.

For example, the reference number is assumed to be set to five times, and the number of user operations in an incorrect pattern when a malfunction does not occur is also assumed to be five times. In this case, the sub processor 160 recognizes that it has wrongly detected user operations received during normal working of the image forming apparatus 100 as user operations indicating a possibility that a malfunction has occurred. Therefore, the sub processor 160 may correct the reference number from five times to six times and the like in order to set the reference number by which a false detection does not occur. As described above, the sub processor 160 can correct the reference number also on the basis of the number of user operations in the incorrect pattern.

Subsequently, when the sub processor 160 completes the correction in step S106, the sub processor 160 serves as the notification unit 163 to transmit a notification indicating that the correction is completed to the main processor 110 (step S107). Then, the sub processor 160 ends the processing.

Explanation will be made again upon returning back to steps S211 and S212 of FIG. 7 in order to explain a procedure of processing in the sequence of time in FIG. 5

The main processor 110 serves as the notification reception unit 111 to determine whether the notification indicating that the correction is completed is received from the sub processor 160 or not (steps S211, S212). Step S211 is performed after the predetermined condition is corrected on the basis of the correct pattern, and step S212 is performed after the predetermined condition is corrected on the basis of the incorrect pattern.

When the notification indicating that the correction is completed is not received in steps S211 and S212 (step S211: NO, step S212: NO), the main processor 110 waits until the notification is received.

When the notification indicating that the correction is completed is received in step S211 (step S211: YES), the main processor 110 proceeds to the processing in step S213. Then, the main processor 110 executes reboot processing of the image forming apparatus 100 for solving the malfunction in the operation panel 150 (step S213), and ends the processing. As described above, the malfunction in the operation panel 150 can be caused by the malfunction in the panel processor 151 or the UI processing unit 112.

When the notification indicating that the correction is completed is received in step S212 (step S212: YES), the main processor 110 proceeds to the processing in step S214. Then, the main processor 110 serves as the power-saving mode setting unit 116 to set the power-saving mode (step S214), and ends the processing.

The reason why the main processor 110 waits until receiving the notification in steps S211 and S212 is that the main processor 110 causes the sub processor 160 to complete the correction of the predetermined condition. More specifically, this prevents ending the correction of the predetermined condition in the sub processor 160 during its processing by executing the reboot processing or setting the power-saving mode before the sub processor 160 completes the correction in step S106.

As described above, according to this embodiment, the image forming apparatus 100 determines whether user operation pattern based on a series of user operations within a certain period of time received by the operation device including the hard key 152 satisfies a predetermined condition or not. Then, when the user operation pattern satisfies the predetermined condition, the image forming apparatus 100 stores a log accumulated in the RAM 125 into the nonvolatile memory 130. The case where the user operation pattern satisfies the predetermined condition corresponds to the case where a malfunction may have occurred in the operation panel 150. In this case, the image forming apparatus 100 can ensure the log before the user turns off and turns on the electric power supply of the image forming apparatus 100 in an attempt to restore the operation panel 150. Since the image forming apparatus 100 can ensure the log before the user turns off the electric power supply of the image forming apparatus 100, it does not need to store the log in the nonvolatile memory 130 with a regular interval of time, and the working performance of the image forming apparatus 100 is not reduced. As a result, the image forming apparatus 100 can ensure the log when a malfunction has occurred, without affecting the working performance of the image forming apparatus 100, so that the log can be provided to the developer and the like who analyzes the malfunction at a later point in time.

When the user operation pattern satisfies the predetermined condition, the image forming apparatus 100 performs availability confirmation on the display processing unit including the panel processor 151 and the UI processing unit 112. Then, when the image forming apparatus 100 does not receive an availability signal from the display processing unit, the image forming apparatus 100 determines that a malfunction has actually occurred in the operation panel 150, and stores the log in the nonvolatile memory 130. The image forming apparatus 100 does not ensure the log soon after detecting a possibility that a malfunction has occurred. In view of a case that user operations received during normal working may be wrongly detected as user operations indicating a possibility that a malfunction has occurred, the image forming apparatus 100 performs the availability confirmation on the display processing unit before ensuring the log. As a result, the image forming apparatus 100 can avoid ensuring the log by mistake during normal working, and ensure the log when a malfunction has occurred, without affecting the working performance of the image forming apparatus 100.

When the user operation pattern satisfies the predetermined condition, the image forming apparatus 100 performs the availability confirmation on the panel processor 151 and the UI processing unit 112. Then, when the image forming apparatus 100 does not receive the availability signal from at least one of the panel processor 151 and the UI processing unit 112, the image forming apparatus 100 stores the log in the nonvolatile memory 130. The image forming apparatus 100 performs the availability confirmation on both of the panel processor 151 and the UI processing unit 112 in view of the fact that a malfunction that occurs in the operation panel 150 is not caused by only a single configuration. As a result, the image forming apparatus 100 can ensure the log for various malfunctions that occur in the operation panel 150.

Even though the image forming apparatus 100 receives the availability signals from both of the panel processor 151 and the UI processing unit 112, when there is a malfunction in the display 153, the image forming apparatus 100 stores the log in the nonvolatile memory 130. The image forming apparatus 100 can detect not only a malfunction caused by the panel processor 151 or the UI processing unit 112 but also a malfunction in the display 153. The image forming apparatus 100 can store the log including information about the malfunction in the display 153 into the nonvolatile memory 130. The developer and the like can quickly identify the malfunction in the display 153 by finding the information to give a feed back to the service personnel, and therefore, the malfunction can be solved immediately. As a result, the image forming apparatus 100 can improve the efficiency for the developer and the like to quickly find a malfunction.

When the number of user operations within a certain period of time is equal to or more than the reference number, the image forming apparatus 100 stores the log in the nonvolatile memory 130. The number of user operations within a certain period of time differs between a case where a malfunction has occurred in the operation panel 150 and normal working. Therefore, as long as the image forming apparatus 100 monitors only the number of user operations with the hard key 152, the image forming apparatus 100 can identify a case where there is a possibility that a malfunction has occurred, and therefore, it is not necessary to store the log in the nonvolatile memory 130 with a regular period of time. As a result, the image forming apparatus 100 can ensure the log on the basis of the number of user operations without affecting the working performance of the image forming apparatus 100.

The image forming apparatus 100 corrects the reference number on the basis of the number of user operations in the correct pattern. The image forming apparatus 100 can use not only the reference number that is set in advance and that can be changed freely, but also the reference number that is based on the actual user operations and that is more suitable for practical use. The image forming apparatus 100 can adjust the accuracy of the reference number, every time the number of user operations is equal to or more than the reference number. As a result, the image forming apparatus 100 can more reliably detect a possibility that a malfunction has occurred.

The image forming apparatus 100 temporarily stores the incorrect pattern in the RAM 125. Then, when a storing of the incorrect pattern still remains in the RAM 125 when the image forming apparatus 100 enters into the power-saving mode, the image forming apparatus 100 corrects the reference number on the basis of the number of user operations in the incorrect pattern. The image forming apparatus 100 can use not only the reference number that is set in advance and that can be changed freely, but also the reference number that is based on the actual user operations and by which a false detection does not occur. Further, the image forming apparatus 100 does not immediately correct the reference number in view of the fact that the incorrect pattern is a user operation pattern operated during normal working. This is because correcting the reference number during normal working leads to reduce the working performance of the image forming apparatus 100. Therefore, the image forming apparatus 100 corrects the reference number only when the image forming apparatus 100 enters into the power-saving mode. As a result, the image forming apparatus 100 can adjust the accuracy of the reference number without affecting the working performance of the image forming apparatus 100, and can more reliably detect a possibility that a malfunction has occurred.

The image forming apparatus 100 executes reboot processing for solving a malfunction in the operation panel 150, i.e., a malfunction in the panel processor 151 or the UI processing unit 112, after storing the log in the nonvolatile memory 130. When a malfunction has occurred, the user may turn off and turn on the electric power supply of the image forming apparatus 100 in an attempt to restore the operation panel 150. The image forming apparatus 100 reboots itself when a malfunction has occurred, to save the user from turning off and turning on the electric power supply.

The image forming apparatus 100 comprises the main processor 110 and the sub processor 160, and when the main processor 110 receives the notification indicating that the predetermined condition is satisfied from the sub processor 160, the main processor 110 stores the log in the nonvolatile memory 130. As described above, the sub processor 160 is a configuration that is originally used for the power-saving mode. Therefore, the image forming apparatus 100 can realize this embodiment without any additional configuration.

In the above embodiment, an example of a procedure of processing of the image forming apparatus 100 has been explained. However, the present invention is not limited thereto. Various changes, variations, and the like described below are possible.

In the above embodiment, the image forming apparatus 100 comprises the main processor 110 and the sub processor 160. However, the present invention is not limited thereto. In the image forming apparatus 100, the functional configuration of the sub processor 160 may be realized in the main processor 110, so that the sub processor 160 may be omitted. In this case, the main processor 110 performs all the processing (step S101 to S107 and step S201 to S214). The main processor 110 does not need to transmit and receive notifications and requests to and from the sub processor 160, and the processing can be completed within the inside of the main processor 110. Therefore, the image forming apparatus 100 can shorten the processing time. However, in this case, the hard key 152 illustrated in FIG. 1 needs to be directly connected to the main processor 110. In the image forming apparatus 100, the sub processor 160 is not a necessary configuration, and even though the image forming apparatus 100 does not have the sub processor 160, this embodiment can be realized without any additional configuration.

In step S101 of the above embodiment, the image forming apparatus 100 receives, via the hard key 152, user operations indicating a possibility that a malfunction has occurred in the operation panel 150. However, the present invention is not limited thereto. The image forming apparatus 100 may receive user operations indicating a possibility that a malfunction has occurred via the software key displayed on the display 153. In this case, the software key as well as the hard key 152 constitutes the operation device. However, the display 153 displaying the software key is usually connected only to the panel processor 151. For this reason, the monitoring of the software key is required to be performed in the panel processor 151. More specifically, only when the panel processor 151 is available, the monitoring of the software key is realized. The panel processor 151 needs to comprise the same functional configuration as the operation pattern determination unit 162 of the sub processor 160. When these conditions are satisfied, the image forming apparatus 100 can monitor not only the hard key 152 but also the software key, and can more reliably detect a possibility that a malfunction has occurred.

In step S103 of the above embodiment, the sub processor 160 of the image forming apparatus 100 determines whether the number of user operations within a certain period of time is equal to or more than the reference number or not. However, the present invention is not limited thereto. The sub processor 160 may perform only the processing in step S101, and the subsequent processing may be performed by the main processor 110.

In step S103 of the above embodiment, when the sub processor 160 of the image forming apparatus 100 makes a determination with regard to the number of user operations, the sub processor 160 may refer to the reference number that is set individually for each user. More specifically, the sub processor 160 may store, in the nonvolatile storage area of itself, the reference number that is set individually for each user. In this case, when the user starts using the image forming apparatus 100, the image forming apparatus 100 needs to authenticate the user with the user authentication unit 175. When the image forming apparatus 100 can authenticate the user, in step S103, the sub processor 160 can make a determination with regard to the number of user operations by referring to the reference number that is set individually for each user authenticated. Naturally, also in step S106, the sub processor 160 may correct the reference number that is set individually for each user. As a result, the image forming apparatus 100 can improve the accuracy of the reference number for each user, and can more reliably detect a possibility that a malfunction has occurred in the operation panel 150.

In step S202 of the above embodiment, the main processor 110 of the image forming apparatus 100 performs availability confirmation on the panel processor 151 and the UI processing unit 112. However, the present invention is not limited thereto. The main processor 110 may perform availability confirmation on any given configuration other than the panel processor 151 and the UI processing unit 112. Then, in step S203, the main processor 110 may determine whether availability signals have been received from all the configurations on which the availability confirmation has been performed. The image forming apparatus 100 can more reliably detect a malfunction by performing the availability confirmation on any other configuration. Alternatively, the main processor 110 may not perform the availability confirmation at all. In this case, when the main processor 110 receives the notification indicating that the predetermined condition is satisfied in step S201, the main processor 110 skips steps S202 and S203, and proceeds to step S204. Since the processing can be omitted, the image forming apparatus 100 can ensure the log more quickly.

In step S204 of the above embodiment, the main processor 110 of the image forming apparatus 100 may store the log in a nonvolatile memory provided in an external server. In this case, the developer and the like can obtain the log via the server, and therefore, the service personnel who visits the user of the image forming apparatus 100 is saved from the time and the labor for sending the log to the developer and the like. The image forming apparatus 100 can improve the efficiency for the developer and the like to quickly find a malfunction.

In step S208 of the above embodiment, the main processor 110 of the image forming apparatus 100 waits until the power-saving mode is set when the power-saving mode is not set. However, the present invention is not limited thereto. The main processor 110 may limit the time for which the main processor 110 waits until the power-saving mode is set. In this case, in step S207, the main processor 110 starts measuring the time from temporarily storing the incorrect pattern in the RAM 125. Then, in step S208, when the time that has elapsed while the main processor 110 does not set the power-saving mode is more than a predetermined timeout period, the main processor 110 starts monitoring the processing load of the image forming apparatus 100. Then, when the processing load of the image forming apparatus 100 is less than a predetermined threshold value, the main processor 110 proceeds to the processing in steps S209 and S210 without waiting for setting the power-saving mode. The reason for limiting the time for which the main processor 110 waits until the power-saving mode is set is to correct the reference number on the basis of the incorrect pattern before the storing of the incorrect pattern in the RAM 125 is lost as the time elapses. The image forming apparatus 100 may reduce the working performance of itself by correcting during normal working, and therefore, the image forming apparatus 100 corrects the reference number only when the processing load is less than the predetermined threshold value. The image forming apparatus 100 can correct the reference number without losing the storing of the incorrect pattern.

Hereinafter, a still further variations will be explained with reference to drawings.

(First Variation)

The above embodiment explained that the image forming apparatus 100 determines whether the number of user operations within a certain period of time is equal to or more than the reference number or not. On the other hand, in the first variation, the image forming apparatus 100 determines whether the number of times of vibrations (hereinafter referred to as "the number of vibrations") within a certain period of time based on vibrations of the operation panel 150 is equal to or more than a reference number or not, instead of making a determination with regard to the number of user operations.

Figure 8:
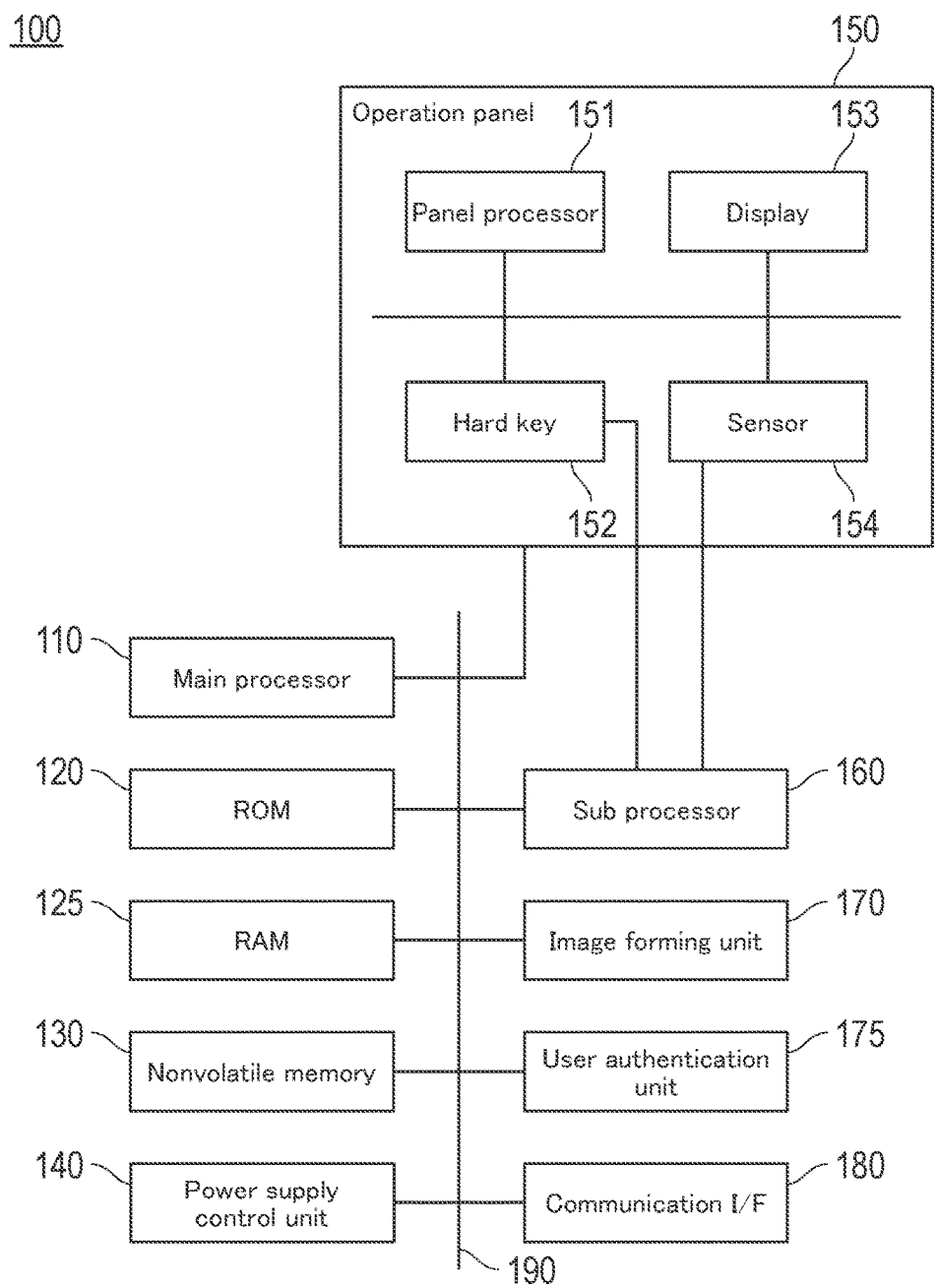
FIG. 8 is a block diagram illustrating a schematic configuration of an image forming apparatus according to a first variation.

FIG. 8 is a block diagram illustrating a schematic configuration of the image forming apparatus 100 according to the first variation. As compared with FIG. 1, a sensor 154 is added to the operation panel 150.

The sensor 154 is a sensor for detecting vibrations such as an acceleration sensor, a vibration sensor, a shock sensor, and the like. The sensor 154 is provided on the operation panel 150 or in the inside of the operation panel 150. The sensor 154 can detect vibrations generated in the operation panel 150 by user operations such as pressing down of the hard key 152 and the like. It should be noted that the sensor 154 is directly connected to the sub processor 160, as well as the hard key 152.

A procedure of processing of the image forming apparatus 100 according to the first variation will be explained with reference to FIG. 9.

Figure 9:
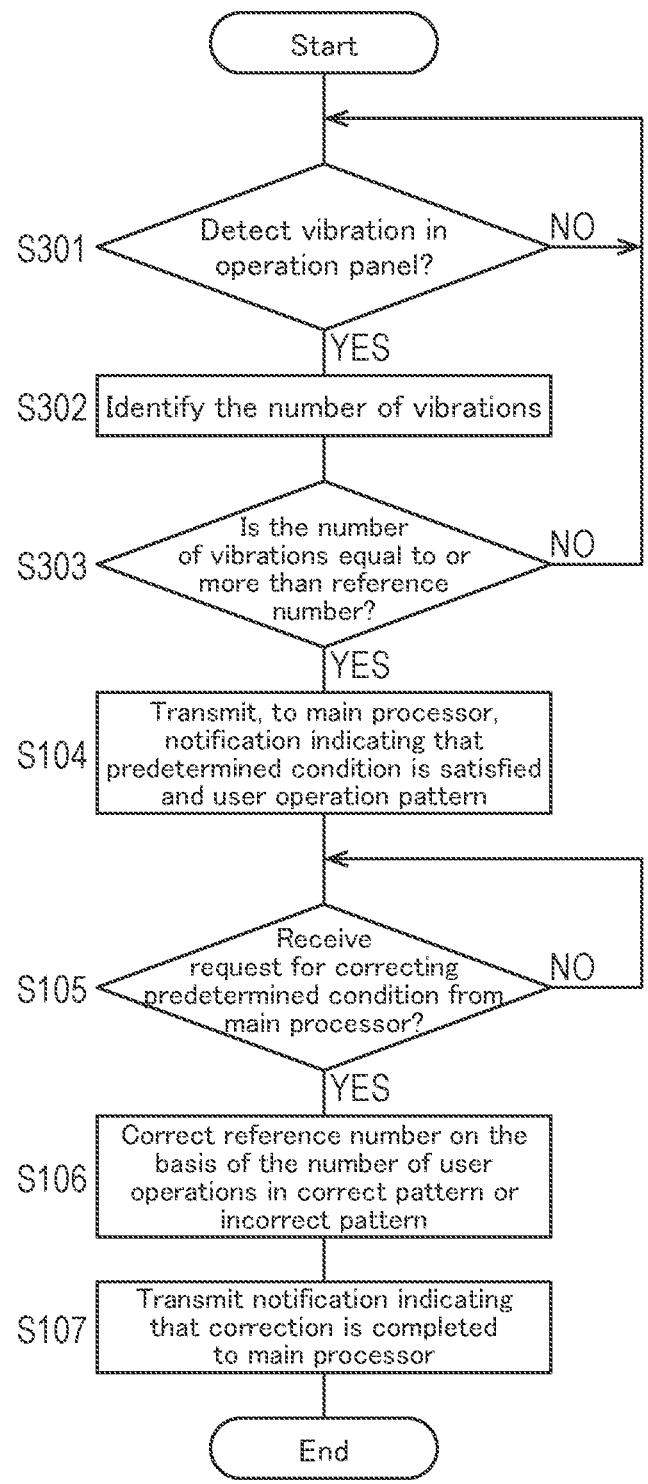
FIG. 9 is a flowchart illustrating another example of a procedure of processing of a sub processor.

FIG. 9 is a flowchart illustrating another example of a procedure of processing of the sub processor 160. The processing illustrated in the flowchart of FIG. 9 is stored as a program in the nonvolatile storage area inside of the sub processor 160. In the steps of FIG. 9, steps S104 to 107 are the same as steps of FIG. 6, and therefore explanation thereabout is omitted.

First, the sub processor 160 determines whether a vibration in the operation panel 150 is detected or not, via the sensor 154 (step S301). In this case, the sub processor 160 reads the program and executes the processing to function as a vibration detection unit.

When a vibration is not detected (step S301: NO), the sub processor 160 waits until a vibration is detected.

When a vibration is detected (step S301: YES), the sub processor 160 proceeds to the processing in step S302. Then, the sub processor 160 serves as the operation pattern determination unit 162 to identify the number of vibrations based on the vibrations detected by the sensor 154 within a certain period of time and deem that the number of vibrations is the number of user operations in the user operation pattern (step S302).

Subsequently, the sub processor 160 determines whether the identified number of vibrations within a certain period of time satisfies a predetermined condition or not. In the first variation, the sub processor 160 serves as the operation pattern determination unit 162 to determine whether the number of vibrations within a certain period of time is equal to or more than the reference number or not (step S303).

In step S303, the reason why a determination is made as to whether the number of vibrations is equal to or more than the reference number or not is as follows. When a malfunction has occurred in the operation panel 150, the user may repeatedly hit the hard key 152 of the operation panel 150, the software key displayed on the display 153, and the like in order to determine whether a malfunction has occurred or not. When the user repeatedly hits the hard key 152, the software key, and the like, and vibrations are generated in the operation panel 150, the sensor 154 detects vibrations. On the other hand, it is unlikely that the user repeatedly hits the hard key 152 and the like during normal working of the image forming apparatus 100, and therefore, the sensor 154 does not detect vibrations caused by repeated hitting. As described above, there is a difference in the situation between a case where a malfunction has occurred and normal working, and therefore, the above determination is made in step S303.

When the number of vibrations is not equal to or more than the reference number (step S303: NO), the sub processor 160 determines that a malfunction does not occur in the operation panel 150, and returns back to the processing in step S301. Then, the sub processor 160 waits until a new vibration is received.

When the number of vibrations is equal to or more than the reference number (step S303: YES), the sub processor 160 proceeds to the processing in step S104 and subsequent steps. In step S104 and subsequent steps, the sub processor 160 deems that the number of vibrations is the number of user operations in the user operation pattern, within a certain period of time, and continues the processing.

As described above, according to the first variation, the image forming apparatus 100 further comprises the sensor 154 capable of detecting vibrations generated by user operations. Then, the sub processor 160 of the image forming apparatus 100 deems that the number of vibrations detected by the sensor 154 is the number of user operations within a certain period of time, and determines whether the number of vibrations is equal to or more than the reference number or not. In the first variation, the image forming apparatus 100 can detect vibrations generated by the user operations performed not only with the hard key 152, but also with the software key. Therefore, the image forming apparatus 100 can monitor the user operations performed with the software key even when the panel processor 151 is not available. As a result, the image forming apparatus 100 can monitor the user operations performed with both of the hard key 152 and the software key, and therefore, the image forming apparatus 100 can more reliably detect a possibility that a malfunction has occurred in the operation panel 150. Further, the image forming apparatus 100 can realize this embodiment even when the image forming apparatus 100 does not have the hard key 152.

Also in the first variation, in step S303, when the sub processor 160 of the image forming apparatus 100 makes a determination with regard to the number of vibrations, the sub processor 160 may refer to the reference number that is set individually for each user. By referring to the reference number that is set individually for each user authenticated, the image forming apparatus 100 can more reliably detect a possibility that a malfunction has occurred in the operation panel 150.

(Second Variation)

The above embodiment explained a case where the image forming apparatus 100 makes the determination on the basis of the reference number. On the other hand, in the second variation, an image forming apparatus 100 makes a determination on the basis of a matching rate with respect to a reference pattern.

A procedure of processing of the image forming apparatus 100 according to the second variation will be explained with reference to FIG. 10. It should be noted that a schematic configuration of the image forming apparatus 100 according to the second variation is the same as FIG. 1.

Figure 10:
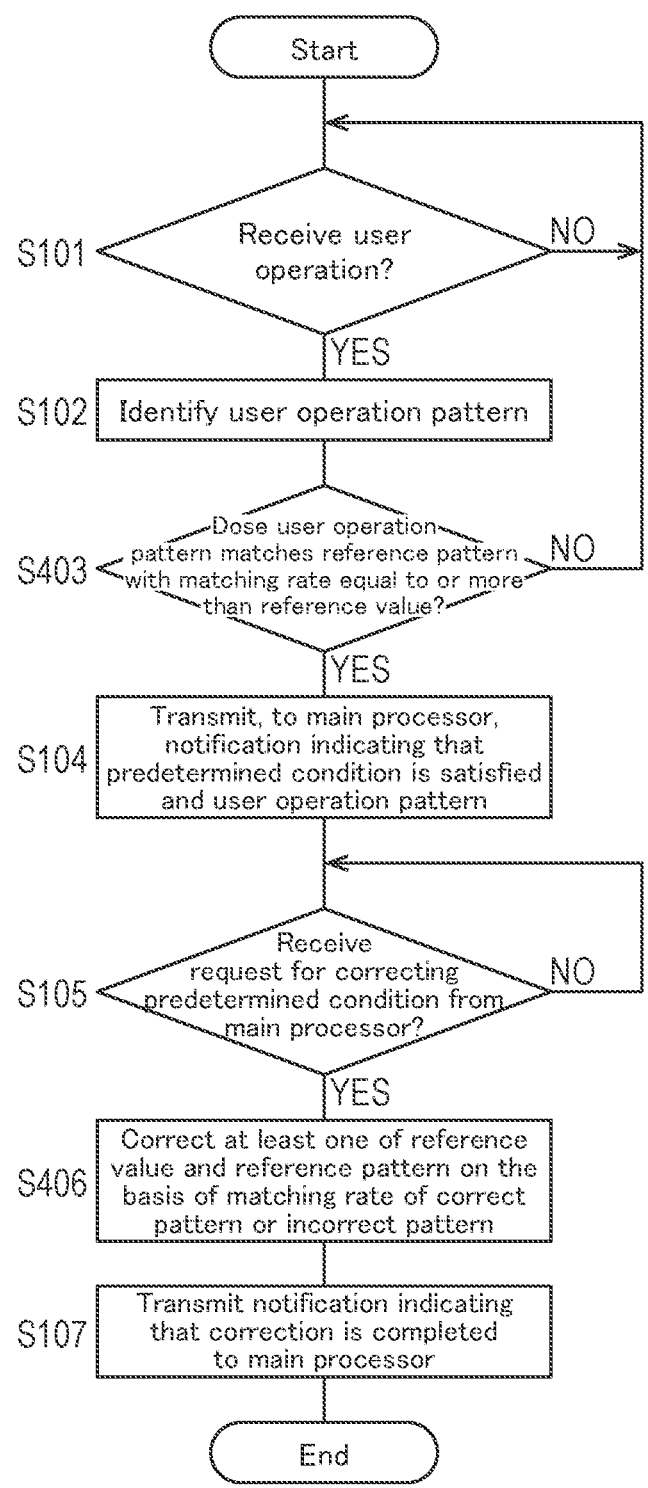
FIG. 10 is a flowchart illustrating still another example of a procedure of processing of a sub processor.

FIG. 10 is a flowchart illustrating still another example of a procedure of processing of the sub processor 160. The processing illustrated in the flowchart of FIG. 10 is stored as a program in the nonvolatile storage area inside of the sub processor 160. The steps of FIG. 10 except step S403, S406 are the same as steps of FIG. 6, and therefore explanation thereabout is omitted.

In step S403, the sub processor 160 determines whether the user operation pattern based on the series of the user operations within a certain period of time satisfies a predetermined condition or not. In the second variation, the predetermined condition means that the user operation pattern matches a predetermined operation pattern serving as a reference (hereinafter referred to as "reference pattern") with a matching rate equal to or more than a predetermined reference value. More specifically, the sub processor 160 serves as the operation pattern determination unit 162 to determine whether the user operation pattern matches the reference pattern with a matching rate equal to or more than the reference value or not (step S403).

In step S403, the reason why a determination is made as to whether the user operation pattern matches the reference pattern with a matching rate equal to or more than the reference value or not is as follows. When a malfunction has occurred in the operation panel 150, the user may sequentially operate multiple hard keys of the hard key 152 to determine whether there is a key that can be operated or not, in order to determine whether a malfunction has occurred or not. On the other hand, during normal working of the image forming apparatus 100, it is unlikely that the user sequentially continues to operate multiple hard keys in order to determine whether there is a key that can be operated or not. Therefore, in step S403, the above determination is made. The user operation pattern in step S403 means a pattern that is not identified by the number of user operations but is identified by which type of hard keys the user operated in what kind of order.

The determination in step S403 will be explained with reference to an example. For example, the hard key 152 is assumed to be arranged as illustrated in FIG. 2. Then, the reference pattern is assumed to be set to "a pattern for pressing down each of 10 different hard keys other than the power key at least once within a certain period of time", and the reference value is assumed to be set to 700. When the user operation pattern is "a pattern for pressing down each of 8 different hard keys other than the power key at least once within a certain period of time", then the matching rate for the reference pattern is 80%. In this case, the user operation pattern matches the reference pattern with a matching rate (80%) equal to or more than the reference value (70%). The above example shows an example where the user operation pattern is set for the type of the hard key 152, but may also be set for the order in which the hard key 152 is operated (for example, starting operation from the start key and operating in clockwise direction).

When the user operation pattern does not match the reference pattern with a matching rate equal to or more than the reference value (step S403: NO), the sub processor 160 determines that a malfunction does not occur in the operation panel 150, and returns back to the processing in step S101. Then, the sub processor 160 waits until a new user operation is received.

When the user operation pattern matches the reference pattern with a matching rate equal to or more than the reference value (step S403: YES), the sub processor 160 proceeds to the processing in step S104 and subsequent steps. This means that the sub processor 160 detects a possibility that a malfunction has occurred in the operation panel 150 on the basis of the user operation pattern.

Further, in step S406, the sub processor 160 corrects the predetermined condition on the basis of the matching rate of the correct pattern or the incorrect pattern with respect to the reference pattern. As described above, the correct pattern is a user operation pattern operated when a malfunction has actually occurred, and the incorrect pattern is a user operation pattern operated when a malfunction does not occur. The sub processor 160 serves as the reference pattern correction unit 165 to correct at least one of the reference value and the reference pattern on the basis of the matching rate of the correct pattern or the incorrect pattern with respect to the reference pattern (step S406).

For example, the hard key 152 is assumed to be arranged as illustrated in FIG. 2. Then, the reference pattern is assumed to be set to "a pattern for pressing down each of 10 different hard keys other than the power key at least once within a certain period of time", and the reference value is assumed to be set to 70%. When the correct pattern is "a pattern for pressing down each of 8 different hard keys other than the power key at least once within a certain period of time", then the matching rate with respect to the reference pattern is 80%. In this case, the sub processor 160 serves as the reference pattern correction unit 165, and can correct the reference value from 70% to 80% in order to set a condition that is more suitable for practical use. Alternatively, the sub processor 160 may correct the reference pattern instead of correcting the reference value. More specifically, the sub processor 160 may correct the reference pattern to, e.g., "a pattern for pressing down each of 8 different hard keys other than the power key at least once within a certain period of time". The sub processor 160 may correct both of the reference value and the reference pattern.

For example, the reference pattern is assumed to be set to "a pattern for pressing down each of 10 different hard keys other than the power key at least once within a certain period of time", and the reference value is assumed to be set to 70%, and the matching rate of the correct pattern with respect to the reference pattern is also assumed to be 70%. In this case, the sub processor 160 may predict that it could have detected that a possibility that a malfunction has occurred in a shorter period of time by setting the reference value to a lower value, and may correct the reference value from 70% to 60% and the like. In this case, the sub processor 160 may correct the reference pattern instead of the reference value. The sub processor 160 may correct both of the reference value and the reference pattern. As described above, the sub processor 160 can correct the reference value and the reference pattern on the basis of the correct pattern.

For example, the reference pattern is assumed to be set to "a pattern for pressing down each of 10 different hard keys other than the power key at least once within a certain period of time", and the reference value is assumed to be set to 70%, and the matching rate of the incorrect pattern with respect to the reference pattern is also assumed to be 70%. In this case, the sub processor 160 recognizes that it has wrongly detected user operations received during normal working of the image forming apparatus 100 as user operations indicating a possibility that a malfunction has occurred. Therefore, the sub processor 160 may correct the reference value from 70% to 80% and the like in order to set a condition by which a false detection does not occur. As described above, the sub processor 160 can correct the reference value and the reference pattern also on the basis of the incorrect pattern.

As described above, according to the second variation, the image forming apparatus 100 stores the log in the nonvolatile memory 130 when the user operation pattern matches the reference pattern with a matching rate equal to or more than the reference value. The user operation pattern differs between a case where a malfunction has occurred in the operation panel 150 and a case where normal working is performed. Therefore, as long as the image forming apparatus 100 monitors only the user operation pattern with the hard key 152, the image forming apparatus 100 can identify a case where there is a possibility that a malfunction has occurred. The setting of the reference value and the reference pattern has a higher degree of flexibility than the setting of the reference number, and therefore, the image forming apparatus 100 can set a condition that is more suitable for practical use. As a result, the image forming apparatus 100 can ensure the log on the basis of user operation pattern without affecting the working performance of the image forming apparatus 100.

The image forming apparatus 100 corrects at least one of the reference value and the reference pattern on the basis of the matching rate of the correct pattern with respect to the reference pattern. The image forming apparatus 100 can use not only the reference value and the reference pattern that is set in advance and that can be changed freely, but also the reference value and the reference pattern that is based on the actual user operations and that is more suitable for practical use. The image forming apparatus 100 can adjust the accuracy of at least one of the reference value and the reference pattern, every time the user operation pattern matches the reference pattern with a matching rate equal to or more than the reference value. As a result, the image forming apparatus 100 can more reliably detect a possibility that a malfunction has occurred.

The image forming apparatus 100 temporarily stores the incorrect pattern in the RAM 125. Then, when a storing of the incorrect pattern still remains in the RAM 125 in a case that the image forming apparatus 100 enters into the power-saving mode, the image forming apparatus 100 corrects at least one of the reference value and the reference pattern on the basis of the matching rate of the incorrect pattern with respect to the reference pattern. The image forming apparatus 100 can use not only the reference value and the reference pattern that is set in advance and that can be changed freely, but also the reference value and the reference pattern that is based on the actual user operations and by which a false detection does not occur. Further, the image forming apparatus 100 does not immediately correct at least one of the reference value and the reference pattern in view of the fact that the incorrect pattern is a user operation pattern operated during normal working. This is because correcting at least one of the reference value and the reference pattern during normal working leads to reduce the working performance of the image forming apparatus 100. Therefore, the image forming apparatus 100 corrects at least one of the reference value and the reference pattern only when the image forming apparatus 100 enters into the power-saving mode. As a result, the image forming apparatus 100 can more reliably detect a possibility that a malfunction has occurred in the operation panel 150 without affecting the working performance of the image forming apparatus 100.

Also in the second variation, in step S403, when the sub processor 160 of the image forming apparatus 100 makes a determination with regard to the user operation pattern, the sub processor 160 may refer to the reference value and the reference pattern that are set individually for each user. Also in step S406, the sub processor 160 may correct at least one of the reference value and the reference pattern that is set individually for each user. As a result, the image forming apparatus 100 can improve the accuracy of the reference value and the reference pattern for each user, and can more reliably detect a possibility that a malfunction has occurred in the operation panel 150.

It should be noted that the processing in step S403 according to the second variation may be used in combination with the processing in step S103 in which a determination is made as to whether the number of user operations within a certain period of time is equal to or more than the reference number or not. More specifically, the sub processor 160 of the image forming apparatus 100 may determine that the predetermined condition is satisfied when the number of user operations within a certain period of time is equal to or more than the reference number, and the user operation pattern matches the reference pattern with a matching rate equal to or more than the reference value. In this case, the processing in step S406 may also be used in combination with the processing in step S106, and the sub processor 160 may correct the reference number and at least one of the reference value and the reference pattern.

(Third Variation)

The above embodiment explained a case where the image forming apparatus 100 is used alone. On the other hand, the third variation describes a case where the image forming apparatus 100 is connected and operated by a portable terminal.

Figure 11:
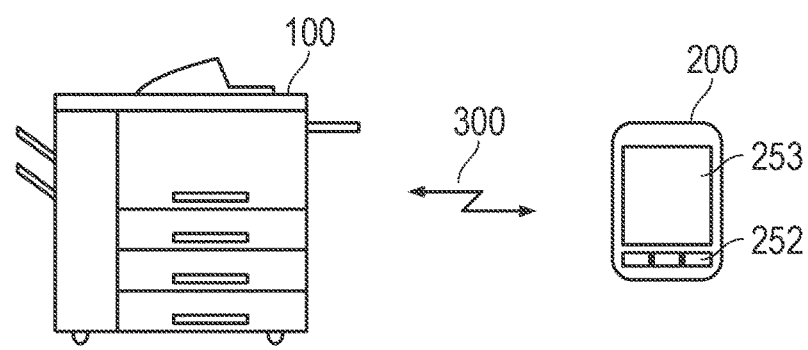
FIG. 11 is a figure illustrating a schematic configuration of an image forming system.

FIG. 11 is a figure illustrating a schematic configuration of an image forming system.

The image forming system includes the image forming apparatus 100 explained in the above embodiment and a portable terminal 200. Each configuration is connected to communicate with each other via a network 300.

The portable terminal 200 is a terminal that can be carried by a user such as a tablet terminal, a smartphone, and the like. The portable terminal 200 remotely operates the image forming apparatus 100 via the network 300, and transmits a print job and the like to the image forming apparatus 100.

The network 300 is constituted by LAN (Local Area Network) based on specifications such as Ethernet (registered trademark), FDDI (Fiber Distributed Data Interface), Wi-Fi (Wireless Fidelity), and the like, and WAN (Wide Area Network) in which LANs are connected by dedicated lines. The types and the number of configurations connected to the network 300 are not limited to those shown in FIG. 11.

Figure 12:
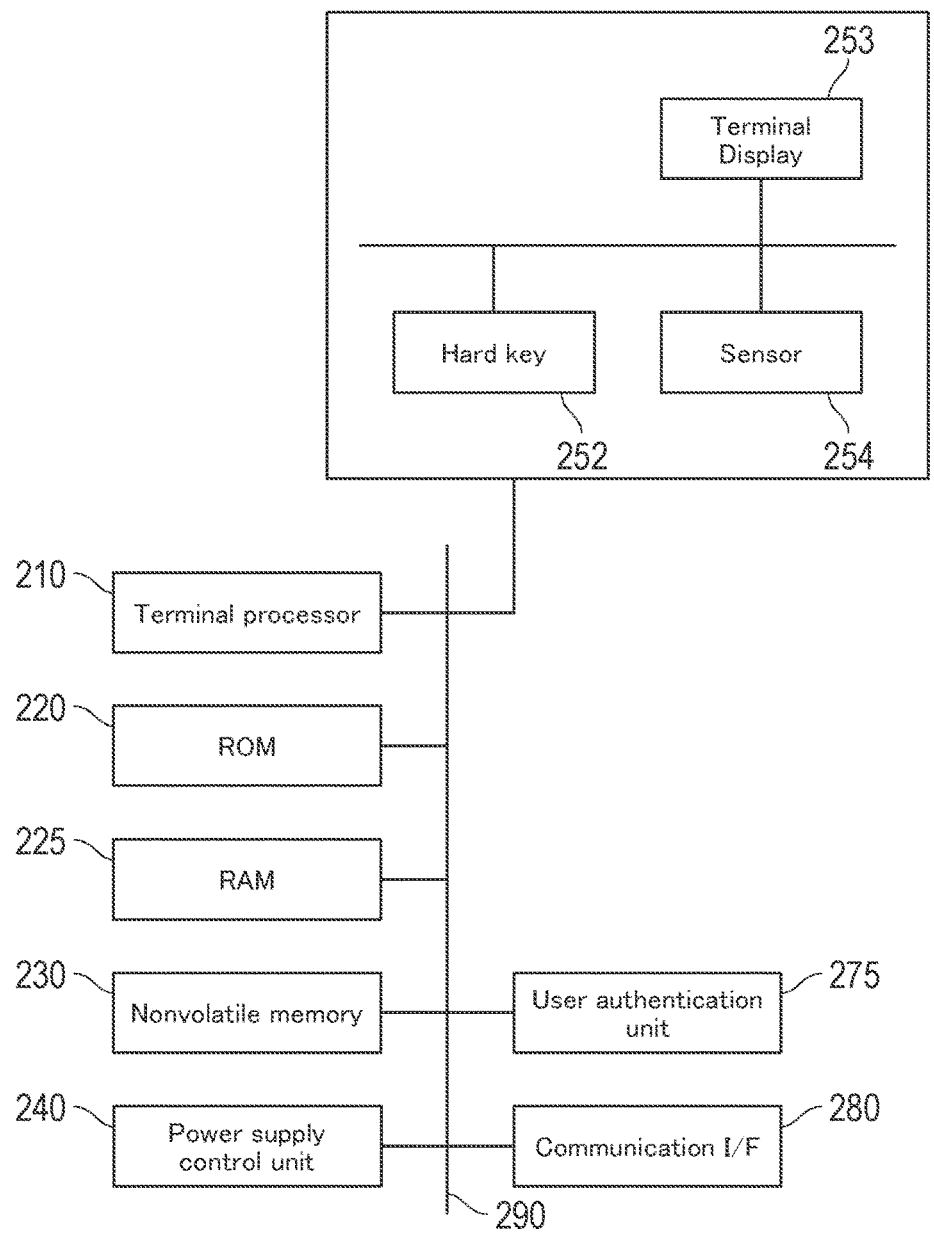
FIG. 12 is a block diagram illustrating a schematic configuration of a portable terminal.

FIG. 12 is a block diagram illustrating a schematic configuration of the portable terminal 200. The portable terminal 200 comprises a terminal processor 210, a ROM 220, a RAM 225, a nonvolatile memory 230, a power supply control unit 240, a hard key 252, a terminal display 253, a sensor 254, a user authentication unit 275, and a communication I/F 280. Each configuration is connected to communicate with each other via a bus 290. Among the configurations of the portable terminal 200, the same configurations as those of the image forming apparatus 100 will be omitted from the explanation.

The terminal processor 210 comprises the same functional configuration as the the sub processor 160 of the image forming apparatus 100 according to the above embodiment, and performs the same processing as the sub processor 160 as shown in FIG. 6, FIG. 9, and FIG. 10. More specifically, the terminal processor 210 determines whether the user operation pattern satisfies a predetermined condition or not, and corrects the predetermined condition in accordance with a request. Further, in the third variation, the terminal processor 210 comprises the same functional configuration as the panel processor 151 of the image forming apparatus 100. More specifically, the terminal processor 210 reads a program and executes processing to function as a display processing unit for controlling the terminal display 253.

The terminal processor 210 receives information such as a user interface and the like from the main processor 110 of the image forming apparatus 100 and displays the user interface and the like on the terminal display 253. More specifically, the user interface controlled by the UI processing unit 112 is displayed on the terminal display 253 controlled by the terminal processor 210 via the terminal processor 210.

In the third variation, the terminal processor 210 performs the processing illustrated in FIG. 6, FIG. 9, and FIG. 10. The terminal processor 210 determines whether a user operation pattern based on a series of user operations within a certain period of time received via the hard key 252 and the like satisfies a predetermined condition or not. The predetermined condition is stored in the nonvolatile memory 230 and the like. Then, the terminal processor 210 transmits a notification indicating that the predetermined condition is satisfied and the user operation pattern to the main processor 110 of the image forming apparatus 100.

Then, the main processor 110 performs the processing illustrated in FIG. 7. When the main processor 110 receives a notification indicating that a predetermined condition is satisfied from the portable terminal 200, the main processor 110 performs availability confirmation on the terminal processor 210 and the UI processing unit 112. When the main processor 110 performs availability confirmation on the terminal processor 210, the terminal processor 210 confirms availability of the display processing unit and the like provided inside of the terminal processor 210. Then, when the main processor 110 does not receive an availability signal from at least one of the terminal processor 210 and the UI processing unit 112, the main processor 110 stores the log in the nonvolatile memory 130. In steps S205 and S210, the main processor 110 transmits a request for correcting the predetermined condition, and a correct or incorrect pattern to the terminal processor 210.

When the terminal processor 210 receives the request for correcting the predetermined condition from the main processor 110, the terminal processor 210 corrects the predetermined condition on the basis of the correct pattern or the incorrect pattern. Then, the image forming apparatus 100 executes reboot processing or sets power-saving mode. In the third variation, in steps S211 and S212, the main processor 110 may wait or may not wait until the main processor 110 receives a notification indicating that a correction is completed from the terminal processor 210. This is because even though the image forming apparatus 100 executes the reboot processing or sets the power-saving mode, the processing of correction of the terminal processor 210 is not at all affected.

As described above, according to the third variation, when user operation pattern based on a series of user operations within a certain period of time received by the external portable terminal 200 satisfies a predetermined condition, the image forming apparatus 100 receives a notification indicating that the predetermined condition is satisfied from the portable terminal 200. Then, when the image forming apparatus 100 receives the notification indicating that the predetermined condition is satisfied, the image forming apparatus 100 stores the log in the nonvolatile memory 130. When the display of the terminal display 253 of the portable terminal 200 is frozen, the user of the portable terminal 200 remotely operating the image forming apparatus 100 may suspect a malfunction in the portable terminal 200. Then, when the user finds that there is no malfunction in the portable terminal 200, the user may subsequently suspect a malfunction in the image forming apparatus 100, and turn off and turn on the electric power supply of the image forming apparatus 100. The image forming apparatus 100 can ensure the log before the user turns off and turns on the electric power supply of the image forming apparatus 100.

When the image forming apparatus 100 receives the notification indicating that the predetermined condition is satisfied, the image forming apparatus 100 performs the availability confirmation on the UI processing unit 112 and the terminal processor 210 of the portable terminal 200. Then, when the image forming apparatus 100 does not receive an availability signal from at least one of the terminal processor 210 and the UI processing unit 112, the image forming apparatus 100 stores the log in the nonvolatile memory 130. When a malfunction such as a freeze has occurred in the terminal display 253 of the portable terminal 200, the image forming apparatus 100 performs the availability confirmation on both of the terminal processor 210 and the UI processing unit 112 in view of the fact that the malfunction is not caused by only the image forming apparatus 100. As a result, the image forming apparatus 100 can avoid ensuring the log by mistake during normal working.

Also in the third variation, even though the image forming apparatus 100 receives availability signals from both of the terminal processor 210 and the UI processing unit 112, when there is a malfunction in the terminal display 253, the image forming apparatus 100 may store the log in the nonvolatile memory 130.

In the third variation, the terminal processor 210 of the portable terminal 200 determinates whether the predetermined condition is satisfied or not. However, the present invention is not limited thereto. When the portable terminal 200 receives user operations, the portable terminal 200 may transmit a signal indicating user operations to the image forming apparatus 100, and the image forming apparatus 100 may make a determination with regard to the user operation pattern on the basis of the user operations.

The third variation may be used in combination with the first variation and the second variation. More specifically, instead of making a determination with regard to the number of user operations, the portable terminal 200 may make a determination with regard to the number of vibrations (first variation) or the matching rate with respect to the reference pattern of the user operation pattern (second variation). When the third variation is combined with the first variation, the portable terminal 200 make a determination with regard to the number of vibrations based on the vibrations detected by the sensor 254.

In the above embodiment, the image forming apparatus 100 is explained as a single apparatus. However, the present invention is not limited thereto. An information processing apparatus for determining whether a user operation pattern satisfies a predetermined condition or not and performing availability confirmation on the panel processor 151 and the UI processing unit 112 and an apparatus for performing print processing may be configured separately. In this case, the information processing apparatus and an apparatus for performing print processing are connected via a bus.

The processing performed with the image forming apparatus 100 according to the present invention may be achieved with a dedicated hardware circuit for executing each of the above procedures, or may be achieved by executing a program describing each of the above procedures by a CPU. When the present invention is achieved by the latter, the above program for operating the image forming apparatus 100 may be provided by a computer readable recording medium such as a USB memory, a floppy (registered trademark) disk, and a CD-ROM, or may be provided online via a network such as the Internet. In this case, the program recorded on the computer readable recording medium is usually transferred to and stored in a memory, a hard disk, and the like. This program may be provided as, for example, an independent application software, or may be incorporated into software of the image forming apparatus 100 as a function of the image forming apparatus 100.

What is claimed is:

1. An image forming apparatus comprising:
a volatile memory accumulating a log of actions of each function and having a volatile property;
an operation device receiving user operations performed by a user; and
a processor comprising (i) a main processor and (ii) a sub processor,
wherein the sub processor is configured to determine whether a user operation pattern based on a series of the user operations within a certain period of time received by the operation device satisfies a predetermined condition or not, the predetermined condition indicating a possibility of malfunction of the image forming apparatus, and to transmit a notification to the main processor when the predetermined condition is satisfied by the user operation pattern, and
wherein the main processor is configured to receive the notification from the sub processor and to store the log accumulated in the volatile memory into a nonvolatile memory of the image forming apparatus having a nonvolatile property when the user operation pattern satisfies the predetermined condition.

2. The image forming apparatus according to claim 1 further comprising:
a display capable of displaying a user interface; and
a display processing unit controlling the display,
wherein when the user operation pattern satisfies the predetermined condition, the processor performs availability confirmation on the display processing unit to determine whether the processor receives an availability signal indicating availability from the display processing unit or not, and stores the log in the nonvolatile memory when the processor does not receive the availability signal.

3. The image forming apparatus according to claim 2, wherein the display processing unit includes a panel processor configured to control each function of an operation panel including the display, and a UI processing unit for controlling the user interface displayed on the display,
wherein when the user operation pattern satisfies the predetermined condition, the processor performs the availability confirmation on the panel processor and the UI processing unit, and stores the log in the nonvolatile memory when the processor does not receive the availability signal from at least one of the panel processor and the UI processing unit.

4. The image forming apparatus according to claim 3, wherein when the processor receives the availability signal from both of the panel processor and the UI processing unit, the processor further determines whether there is a malfunction in the display or not via the panel processor, and stores the log in the nonvolatile memory when there is the malfunction in the display.

5. The image forming apparatus according to claim 2, wherein the predetermined condition includes a case where a number of times of the series of the user operations in the user operation pattern is equal to or more than a reference number of times.

6. The image forming apparatus according to claim 5, further comprising a sensor capable of detecting vibrations generated by the user operations,
wherein the processor deems that the number of times of vibrations detected by the sensor is the number of times of the series of the user operations, and determines whether the number of times of vibrations is equal to or more than the reference number of times or not.

7. The image forming apparatus according to claim 5, wherein when the number of times of the series of the user operations is equal to or more than the reference number of times, and the processor does not receive the availability signal, the processor corrects the reference number of times on the basis of the number of times of the series of the user operations.

8. The image forming apparatus according to claim 5, wherein when the number of times of the series of the user operations is equal to or more than the reference number of times, and the processor receives the availability signal, the processor temporarily stores the user operation pattern as an incorrect pattern in the volatile memory, and
when a storing of the incorrect pattern still remains in the volatile memory in a case that an electric power supply to the volatile memory is stopped, the processor corrects the reference number of times on the basis of the number of times of the series of the user operations in the incorrect pattern.

9. The image forming apparatus according to claim 2, wherein the predetermined condition includes a case where the user operation pattern matches a reference pattern, which is an operation pattern serving as a reference, with a matching rate equal to or more than a reference value.

10. The image forming apparatus according to claim 9, wherein when the user operation pattern matches the reference pattern with the matching rate equal to or more than the reference value, and the processor does not receive the availability signal, the processor corrects at least one of the reference value and the reference pattern on the basis of the matching rate of the user operation pattern with respect to the reference pattern.

11. The image forming apparatus according to claim 9, wherein when the user operation pattern matches the reference pattern with the matching rate equal to or more than the reference value, and the processor receives the availability signal, the processor temporarily stores the user operation pattern as an incorrect pattern in the volatile memory, and
when a storing of the incorrect pattern still remains in the volatile memory in a case that an electric power supply to the volatile memory is stopped, the processor corrects at least one of the reference value and the reference pattern on the basis of the matching rate of the incorrect pattern with respect to the reference pattern.

12. The image forming apparatus according to claim 2, wherein the processor executes reboot processing in order to solve the malfunction in the display processing unit after the processor stores the log in the nonvolatile memory.

13. The image forming apparatus according to claim 1, wherein:

the main processor is configured to control each function; and the sub processor is configured to be capable of receiving the user operations via hard keys which are physical keys provided in the operation device, even when the main processor is in a suspended state, wherein the sub processor determines whether the user operation pattern based on the series of the user operations within a certain period of time received via the hard key satisfies the predetermined condition or not, and transmits a notification indicating that the predetermined condition is satisfied to the main processor when the user operation pattern satisfies the predetermined condition, and when the main processor receives the notification from the sub processor, the main processor stores the log in the nonvolatile memory.

14. The image forming apparatus according to claim 1 further comprising a user authentication unit capable of authenticating the user, wherein the predetermined condition is set individually for each of the users authenticated.

15. The image forming apparatus according to claim 1, wherein when the processor receives a notification indicating that the predetermined condition is satisfied from an external portable terminal for receiving user operations and determining whether a user operation pattern based on the series of the user operations within a certain period of time satisfies the predetermined condition or not, the processor stores the log in the nonvolatile memory.

16. The image forming apparatus according to claim 15, wherein when the processor receives the notification, the processor performs availability confirmation on a terminal processor for controlling a terminal display, which is a display provided on the portable terminal, and a UI processing unit for controlling a user interface displayed on the terminal display, and stores the log in the nonvolatile memory when the processor does not receive an availability signal from at least one of the terminal processor and the UI processing unit.

17. A non-transitory computer readable recording medium stored with computer program, for controlling an image forming apparatus, the image forming apparatus comprising a volatile memory accumulating a log of actions of each function and having a volatile property, and an operation device receiving user operations performed by a user, the computer program configured to cause the image forming apparatus to execute a process, the process comprising the steps of:

(a) receiving the user operations via the operation device;

(b) determining, via a sub processor of the image forming apparatus, whether a user operation pattern based on a series of the user operations within a certain period of time received in the step (a) satisfies a predetermined condition or not, the predetermined condition indicating a possibility of malfunction of the image forming apparatus; and (c) when the user operation pattern satisfies the predetermined condition in the step (b), causing the sub processor to transmit a notification to a main processor of the image forming apparatus, and, via the main processor, receiving the notification and storing the log accumulated in the volatile memory into a nonvolatile memory of the image forming apparatus having a nonvolatile property.

18. The non-transitory computer readable recording medium according to claim 17, the process further comprising the step of, before the step (c), (d) when the user operation pattern satisfies the predetermined condition in the step (b), performing availability confirmation on a display processing unit for controlling display on a display capable of displaying user interface to determine whether an availability signal indicating availability is received from the display processing unit or not, wherein in the step (c), when the availability signal is not received in the step (d), the log is stored in the nonvolatile memory.

19. The non-transitory computer readable recording medium according to claim 18, wherein in the step (d), the availability confirmation is performed on a panel processor for controlling each function of an operation panel including the display and a UI processing unit for controlling the user interface displayed on the display, and the panel processor and the UI processing unit included in the display processing unit, in the step (c), when the availability signal is not received from at least one of the panel processor and the UI processing unit in the step (d), the log is stored in the nonvolatile memory.

20. The non-transitory computer readable recording medium according to claim 19, the process further comprising the step of, before the step (c), (e) determining whether there is a malfunction in the display or not when the availability signal is received from both of the panel processor and the UI processing unit in the step (d), wherein even when the availability signal is received from both of the panel processor and the UI processing unit in the step (d), when it is determined that there is the malfunction in the display in the step (e), the log is stored in the nonvolatile memory in the step (c).

21. The non-transitory computer readable recording medium according to claim 18, wherein the predetermined condition includes a case where a number of times of the series of the user operations in the user operation pattern is equal to or more than a reference number of times.

22. The non-transitory computer readable recording medium according to claim 21, wherein in the step (b), the number of times of vibrations detected by a sensor capable of detecting vibrations generated by the user operations, is deemed as the number of times of the series of the user operations, and a determination is made as to whether the number of times of vibrations is equal to or more than the reference number of times or not.

23. The non-transitory computer readable recording medium according to claim 21, the process further comprising the step of, after the step (c), (f) correcting the reference number of times on the basis of the number of times of the series of the user operations, when the number of times of the series of the user operations is equal to or more than the reference number of times in the step (b), and the availability signal is not received in the step (d).

24. The non-transitory computer readable recording medium according to claim 21, the process further comprising the steps of:

(g) temporarily storing the user operation pattern as an incorrect pattern in the volatile memory, when the number of times of the series of the user operations is equal to or more than the reference number of times in the step (b), and the availability signal is received in the step (d); and (h) correcting the reference number of times on the basis of the number of times of the series of the user operations in the incorrect pattern, when a storing of the incorrect pattern still remains in the volatile memory in a case that an electric power supply to the volatile memory is stopped.

25. The non-transitory computer readable recording medium according to claim 18, wherein the predetermined condition includes a case where the user operation pattern matches a reference pattern, which is an operation pattern serving as a reference, with a matching rate equal to or more than a reference value.

26. The non-transitory computer readable recording medium according to claim 25, the process further comprising the step of, after the step (c), (f) correcting at least one of the reference value and the reference pattern on the basis of the matching rate of the user operation pattern with respect to the reference pattern, when the user operation pattern matches the reference pattern with the matching rate equal to or more than the reference value in the step (b), and the availability signal is not received in the step (d).

27. The non-transitory computer readable recording medium according to claim 25, the process further comprising the steps of:

(g) temporarily storing the user operation pattern as an incorrect pattern in the volatile memory, when the user operation pattern matches the reference pattern with the matching rate equal to or more than the reference value in the step (b), and the availability signal is received in the step (d); and (h) correcting at least one of the reference value and the reference pattern on the basis of the matching rate of the incorrect pattern with respect to the reference pattern, when a storing of the incorrect pattern still remains in the volatile memory in a case that an electric power supply to the volatile memory is stopped.

28. The non-transitory computer readable recording medium according to claim 18, the process further comprising the step of:

(i) executing reboot processing in order to solve the malfunction in the display processing unit after the log is stored in the nonvolatile memory in the step (c).

29. The non-transitory computer readable recording medium according to claim 17, wherein the predetermined condition is set individually for each of the users authenticated by a user authentication unit.

30. The non-transitory computer readable recording medium according to claim 17, the process further comprising the step of, before the step (c), (j) receiving a notification indicating that the predetermined condition is satisfied from an external portable terminal for receiving user operations and determining whether a user operation pattern based on the series of the user operations within a certain period of time satisfies the predetermined condition or not, and in the step (c), when the notification is received in the step (j), the log is stored in the nonvolatile memory.

31. The non-transitory computer readable recording medium according to claim 30, the process further comprising the step of:

(k) when the notification is received in the step (j), performing availability confirmation on a terminal processor for controlling a terminal display which is a display provided on the portable terminal and a UI processing unit for controlling a user interface displayed on the terminal display, wherein in the step (c), when an availability signal is not received from at least one of the terminal processor and the UI processing unit in the step (k), the log is stored in the nonvolatile memory.

32. A method for controlling an image forming apparatus comprising a volatile memory accumulating a log of actions of each function and having a volatile property, and an operation device receiving user operations performed by a user, the method comprises:

(a) receiving the user operations via the operation device;

(b) determining, via a sub processor of the image forming apparatus, whether a user operation pattern based on a series of the user operations within a certain period of time received in the step (a) satisfies a predetermined condition or not, the predetermined condition indicating a possibility of malfunction of the image forming apparatus; and (c) when the user operation pattern satisfies the predetermined condition in the step (b), causing the sub processor to transmit a notification to a main processor of the image forming apparatus, and, via the main processor, receiving the notification and storing the log accumulated in the volatile memory into a nonvolatile memory of the image forming apparatus having a nonvolatile property.

* * * * *